United States Patent [19]

Kunihiro

[11] Patent Number: 5,014,295
[45] Date of Patent: May 7, 1991

[54] MULTI-CHANNEL ACCESS CORDLESS TELEPHONE SYSTEM

[75] Inventor: Takushi Kunihiro, Kanagawa, Japan

[73] Assignee: Sony Corporation, Tokyo, Japan

[21] Appl. No.: 426,447

[22] Filed: Oct. 25, 1989

[30] Foreign Application Priority Data

Oct. 28, 1988 [JP] Japan .................................. 63-272396
Dec. 1, 1988 [JP] Japan .................................. 63-304639

[51] Int. Cl.$^5$ ............................................ H04B 7/204
[52] U.S. Cl. .......................................... 379/61; 379/63; 455/34
[58] Field of Search ..................................... 379/61-63, 379/92; 455/34, 54; 340/825.54

[56] References Cited

U.S. PATENT DOCUMENTS 4,682,351 7/1987 Makino ................................... 379/61
4,768,219 8/1988 Yamagata et al. .................... 379/63
4,866,732 9/1989 Carey et al. .......................... 379/63

Primary Examiner—Jin F. Ng
Assistant Examiner—Dwayne D. Bost
Attorney, Agent, or Firm—Alvin Sinderbrand; William S. Frommer

[57] ABSTRACT

A communication channel is established between a master station and one of plural remote stations in a multi-channel access (MCA) cordless telephone system. Access data is transmitted from the master station to all of the remote stations, at the same time, to designate a selected remote station as a representative station. The access data also includes calling data which seeks a response from that representative station. In the absence of a response to the calling data from the previously designated representative station, the station identifying data is changed to designate a new remote station as the representative station. The foregoing process is repeated until a representative station responds to the calling data, whereupon the remote stations are polled, in sequence; and a communication channel is established between the master station and the particular polled station which replies to the polling operation.

22 Claims, 13 Drawing Sheets

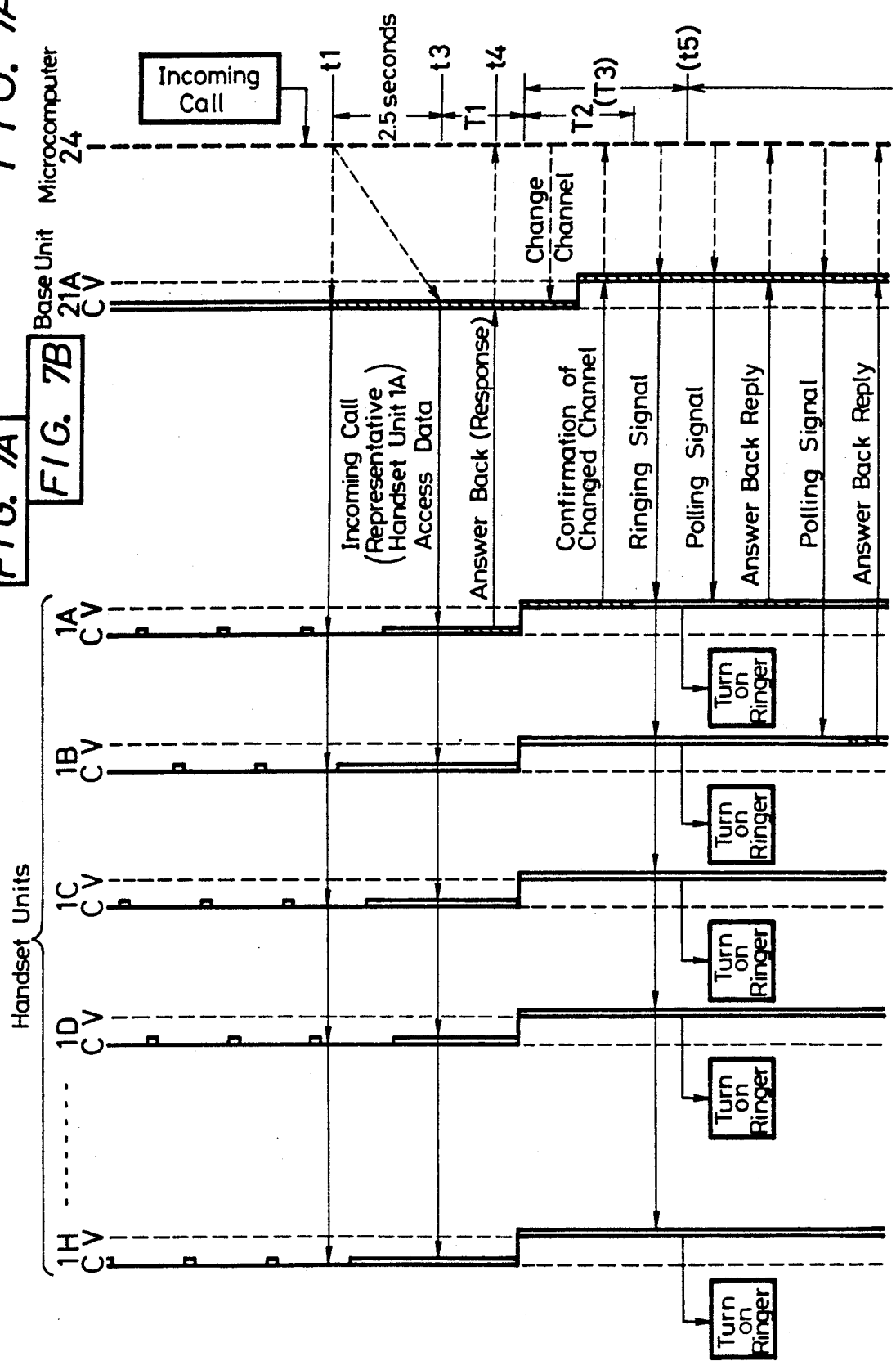

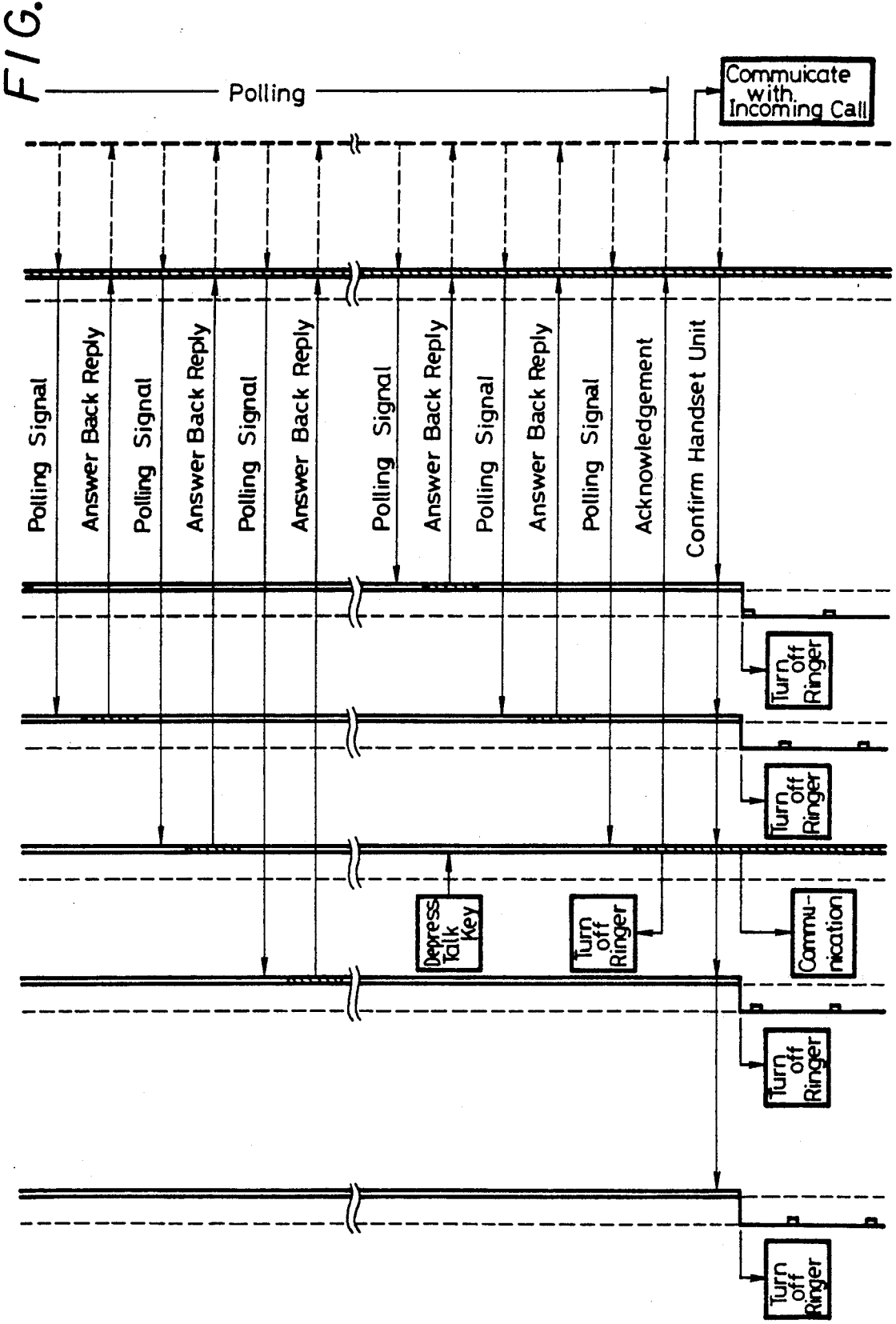

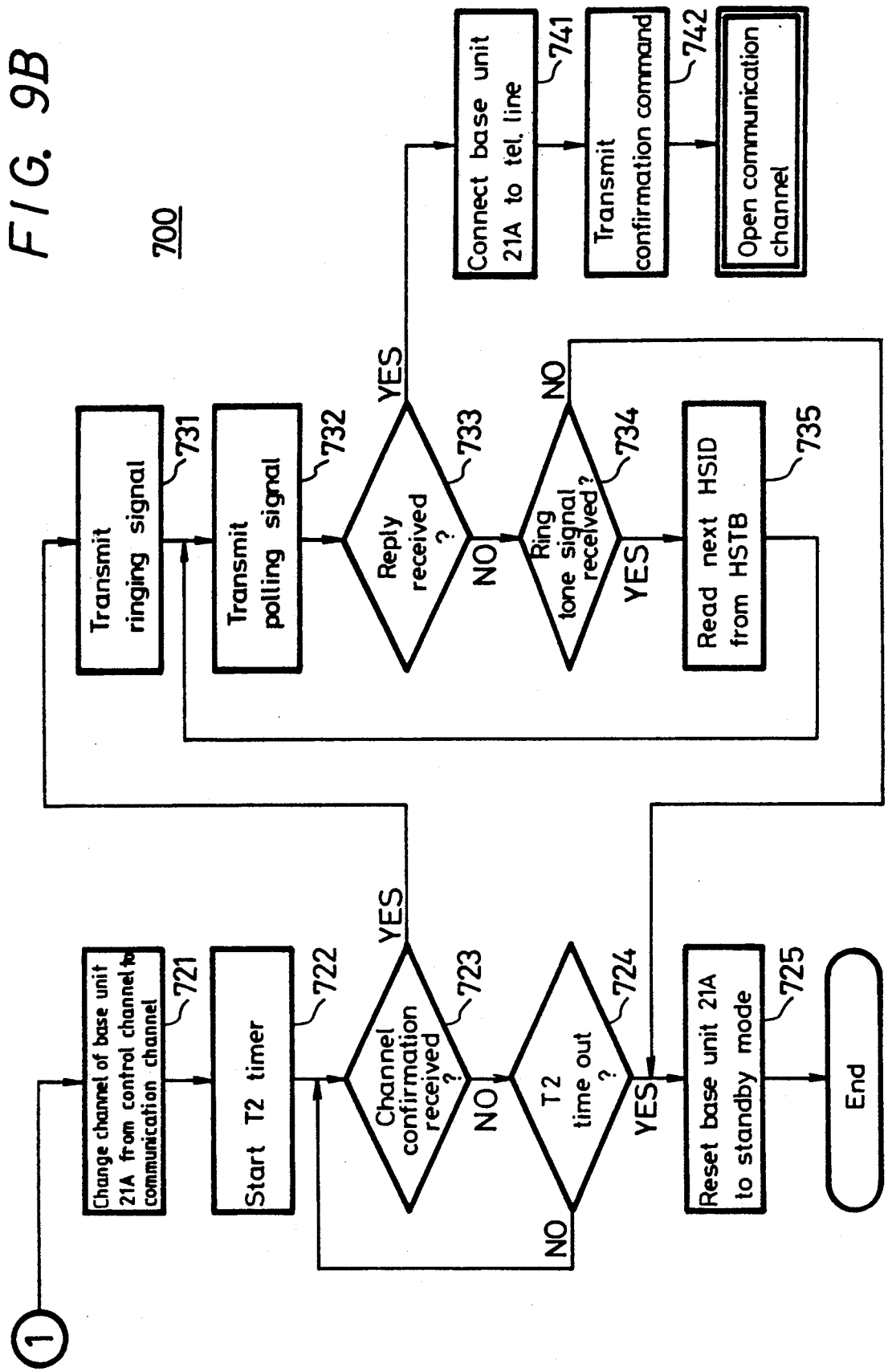

FIG. 11A  Handset    Base
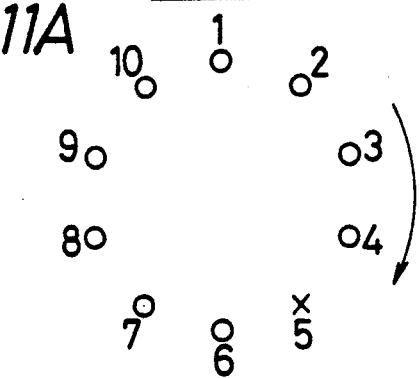 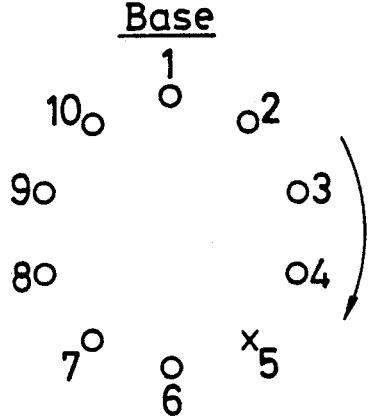
FIG. 11B
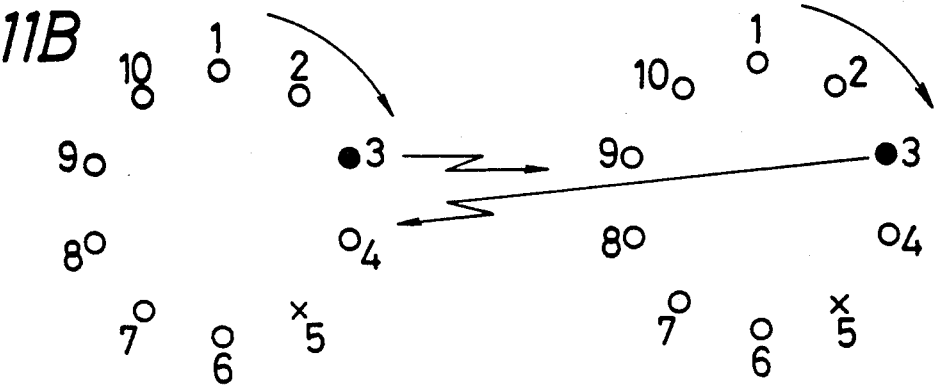
FIG. 11C
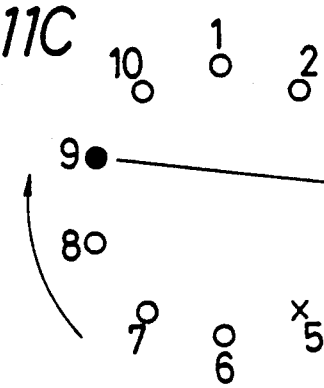 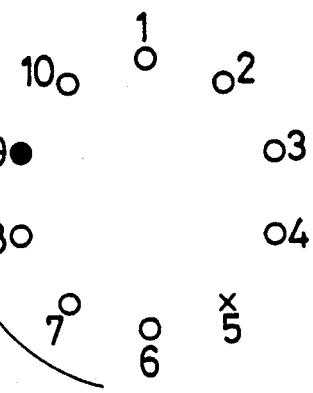

MULTI-CHANNEL ACCESS CORDLESS TELEPHONE SYSTEM

BACKGROUND OF THE INVENTION

1. Field of the Invention

This invention relates to multi-channel access (MCA) cordless telephones of the type generally described in copending application Ser. No. 403,477, filed Sept. 6, 1989 and assigned to the same assignee as the present invention; and, more particularly, to an MCA-type cordless telephone system in which several remote stations, such as handset units, may be queried simultaneously for the purpose of establishing a communication channel with one of them, within a brief period of time.

2. Description of the Prior Art

Cordless telephone systems of the multi-channel access type which rely upon relatively low electrical power requirements have been proposed heretofore. In one such proposal, eighty-seven separate communication channels and two separate control channels are provided, each channel being a "cordless" communication path having a particular carrier frequency onto which information and data are modulated. To expand the functions of an MCA cordless telephone system, a so-called "multi-cordless" arrangement has been introduced in which a master station is comprised of plural base units, each including a set of transmitting and receiving circuits adapted to communicate with one of several remote stations, such as handset units.

An example of the aforementioned multi-cordless telephone arrangement is illustrated in FIG. 1 in which one master station, such as base unit 2, is adapted to communicate with plural remote stations, such as the eight handset units 1A, 1B, . . . 1H that are illustrated. Base unit 2 is connected to a conventional telephone line 3 and is adapted to communicate with the handset units by way of radio transmission between the antenna provided at the base unit and each of the antennas provided at the handset units.

In the arrangement shown in FIG. 1, when an incoming telephone call is received from telephone line 3 to base unit 2, the base unit signals all of handset units 1A-1H at the same time, whereupon one of the handset units responds and, thus, answers the incoming telephone call. Typically, the following techniques are used to signal the handsets and complete a telephone call:

In one technique, base unit 2 signals each of handsets 1A-1H individually and in sequence. At the completion of the entire sequential signalling operation, that is, after the last handset has been signalled, the base unit awaits the response from a handset which wishes to answer the telephone call.

Another technique relies upon simultaneous signalling of all of the handsets, with the expectation that only one handset, that is, the desired handset unit, will respond.

As yet another technique, all of handset units 1A-1H are signalled at the same time, but the signalling identifies a particular handset unit as a "representative handset unit" which is the only unit enabled to respond. Thus, although other "non-representative" units receive the signal from base unit 2, they are inhibited from responding thereto and, thus, are not able to answer the incoming telephone call.

All of the aforementioned techniques suffer from various disadvantages and drawbacks. The first technique, which signals individual handset units in sequence, requires an unusually long period of time to complete the sequential signalling and to answer the incoming telephone call. This is because the handset units are not maintained in a steady receive-enable mode of operation so as to detect base unit signalling. Rather, in an effort to minimize the power requirements of the handset units (due to the fact that these units typically are energized by a battery), a handset unit typically is disposed in a quiescent or "sleep" mode from which it is "awakened" to its receive mode only periodically. For example, and as shown in FIG. 2A, in a 2-second period, the handset unit may be disposed in its receive mode for only 0.2 seconds, while remaining in its quiescent, power-down mode for the remaining 1.8 seconds. Thus, a handset unit is enabled only briefly to receive the signalling transmitted from base unit 2. Furthermore, the periodicity illustrated in FIG. 2A, which illustrates the changeover between the quiescent and receive modes of a handset unit, is not synchronized in all of handset units 1A-1H. Although the repetition rates of these changeover operations may be about the same, the instantaneous times at which the handset units are changed over from their quiescent mode to their receive mode are random.

Accordingly, to ensure that a signal from base unit 2 will be detected by each of handset units 1A-1H, the base unit transmits this signal periodically over a predetermined interval to handset unit 1A, then to handset unit 1B, and so on. As illustrated in FIGS. 2A and 2B, the signal transmitted from the base unit may exhibit a duration of only 120 milliseconds, but this signal is repealed continuously for a period of approximately 2.5 seconds to make certain that the signal is present when handset unit 1A is disposed briefly in its receive mode. It is expected that the handset unit receives the signal from base unit 2 at a time t2, whereafter this handset unit does not return to its quiescent mode but, rather, remains in its receive mode, as represented by the broken line shown in FIG. 2A. Following the end of the 2.5 second signalling interval, which occurs at time t3, the signalled handset unit responds at, for example, time t4, as illustrated in FIG. 2C. This "answer back" signal is delayed by an amount & following the end of the signalling interval. The "answer back" signal is detected at base unit 2 to establish a communication channel between the base unit and the responding handset unit (assumed herein to be handset unit 1A).

In a typical MCA cordless telephone system, the signalling from base unit 2 to a handset unit and the "answer back" from that handset unit are carried out over a control channel which, typically, is separate and distinct from the communication channel. Since the use of the control channel for other purposes generally is not permitted, a handset unit is inhibited from responding to the signalling from the base unit until all of the handset units have been signalled. Once this signalling is completed, the base unit awaits the receipt of an "answer back" from one of the handset units, whereafter a call indicator at that handset unit, such as a ringing device, is energized. It is appreciated that if 2.5 seconds are needed to signal one handset unit successfully, twenty seconds (2.5 seconds ×8 handset units) are needed to call all of the handset units. This unusual time delay is unacceptable, especially since an incoming telephone caller may discontinue his telephone call long before it is completed on the assumption that the called party (i.e. base unit 2 in combination with handset units 1A-1H) is not available to "answer".

In the second signalling technique mentioned above, wherein all of the handset units are signalled simultaneously, the time needed to establish a communication channel between the base unit and one handset unit is substantially reduced from that just described. However, it is not unusual for two or more handset units to transmit "answer back" signals to the base unit at time t4. As a result, radio interference between these simultaneously transmitted "answer back" signals prevents the base unit from determining which handset unit wishes to establish the communication channel. Hence, communication is prevented.

In the third of the aforementioned techniques for establishing communication between the base unit and a handset unit, wherein only the representative handset unit is permitted to response to the signalling, the drawbacks generally attending the other two techniques are avoided. However, if the representative handset unit is unable to receive the signal transmitted from base unit 2, or if the representative handset unit is unable to communicate with the base unit, for example, if its battery power is low, if it has malfunctioned or if another cordless telephone in close proximity therewith monopolizes the control channel, or if it is located beyond the effective communication range with the base unit, the signalling process is stopped. That is, base unit 2 is unable to establish communication with the representative handset unit or with any other handset unit. Consequently, an incoming telephone call cannot be "answered" if there is no reply from the representative handset unit, regardless of the reason for that lack of reply.

OBJECTS AND SUMMARY OF THE INVENTION

Therefore, it is an object of the present invention to provide an improved multi-channel access cordless telephone system which avoids the aforenoted disadvantages and drawbacks.

Another object of this invention is to provide an MCA cordless telephone system which avoids cross-modulation when a base unit signals several remote units, without requiring special circuitry to suppress cross-modulation.

A further object of this invention is to provide an MCA cordless telephone system in which several remote stations may be signalled from a master station to establish a communication channel between the master and a remote station in a brief period of time.

An additional object of this invention is to provide an MCA cordless telephone system in which a communication channel may be established quickly between a master station and one of several remote stations, without undesired cross-modulation, and wherein only one remote station at a time is permitted to communicate with the master station.

Yet another object of this invention is to provide an MCA cordless telephone system of the aforementioned type in which initial signalling, such as in response to an incoming telephone call, is carried out between the master and remote stations by way of a separate control channel or, alternatively, by way of an available one of the multi-channels.

Various other objects, advantages and features of the present invention will become readily apparent from the ensuing detailed description, and the novel features will be particularly pointed out in the appended claims.

In accordance with this invention, a communication channel is established between a master station and one of plural remote stations, such as handset units, in a multi-channel access (MCA) cordless telephone system. The master station transmits to the remote stations, at the same time, access data including station identifying data for designating a selected remote station as a representative station and calling data which seeks a response from the representative station. In the event that a response to the calling data is not received from the previously designated representative station, the station identifying data is changed to designate a new remote station as the representative station. When a representative station responds to the calling data, the master station polls the remote stations, in sequence, inviting a reply from each polled station. A communication channel is established between the master and the polled station which replies to the polling operation.

In accordance with one aspect of this invention, the access data is transmitted over a control channel simultaneously to the remote stations, and the response to the calling data is returned to the master station over that control channel. The communication channel, when established, differs from the control channel.

In accordance with another aspect of this invention, the access data is transmitted over an available one of the multi-channels included in the MCA system, and this available channel also is used to return the response from the representative station to the master station, to poll the remote stations and to define the communication channel over which the master station and the poll-replying remote station communicate.

When a separate control channel is used, the access data includes identifying data for selecting the communication channel to which the master and poll-replying remote stations are connected for communication.

In accordance with a feature of this invention, a ringing signal representing an incoming telephone call is transmitted from the master station to the remote stations if the representative station has responded to the access data. The ringing signal is used to energize incoming call indicators, such as ringing circuits, located at each remote station.

As an aspect of the aforementioned feature, an acknowledgment is returned to the master station from a remote station, when that remote station is polled, indicating that the remote station wishes to answer the incoming telephone call. For example, a talk key may be operated at the remote station. Consistent with this aspect, when the master station receives the aforementioned acknowledgment, it terminates the ringing signal which had been transmitted to the remote stations.

As a result of the present invention, if a remote station designated as the representative station does not respond to the access data transmitted from the master station, that is, it does not answer the incoming telephone call, a new representative station is designated. This process continues until, eventually, a designated representative station responds, whereafter all of the remote stations which are capable of communicating with the master station (for example, they are not one of the non-responding stations which had been designated as a representative station) are polled, in sequence, to permit one of the polled stations to "answer" the call.

BRIEF DESCRIPTION OF THE DRAWINGS

The following detailed description, given by way of example, will best be understood in conjunction with the accompanying drawings in which:

FIGS. 7A and 7B are schematic representations of one example of the sequence in which signals are transmitted in accordance with the present invention to "answer" an incoming telephone call;

FIGS. 9A and 9B represent a flow chart which explains the manner in which the master station shown in FIG. 3 operates to "answer" an incoming telephone call;

FIGS. 11A-11C are schematic representations of a cordless telephone system which operates in accordance with the present invention without separate control channels.

DETAILED DESCRIPTION OF PREFERRED EMBODIMENTS

Figure 1:
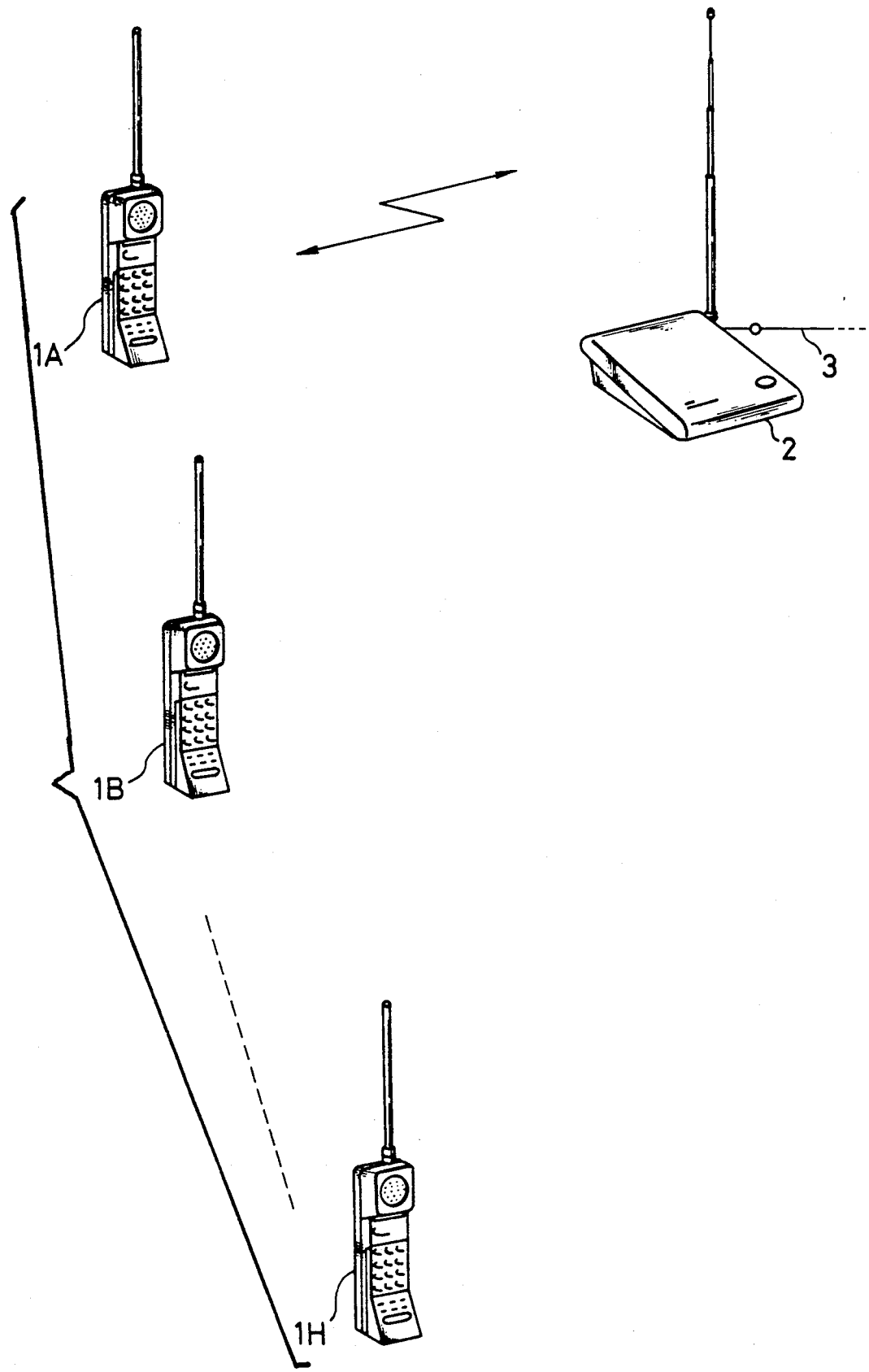
FIG. 1 is a schematic representation of an MCA cordless telephone system in which the present invention finds ready application.
Figure 3:
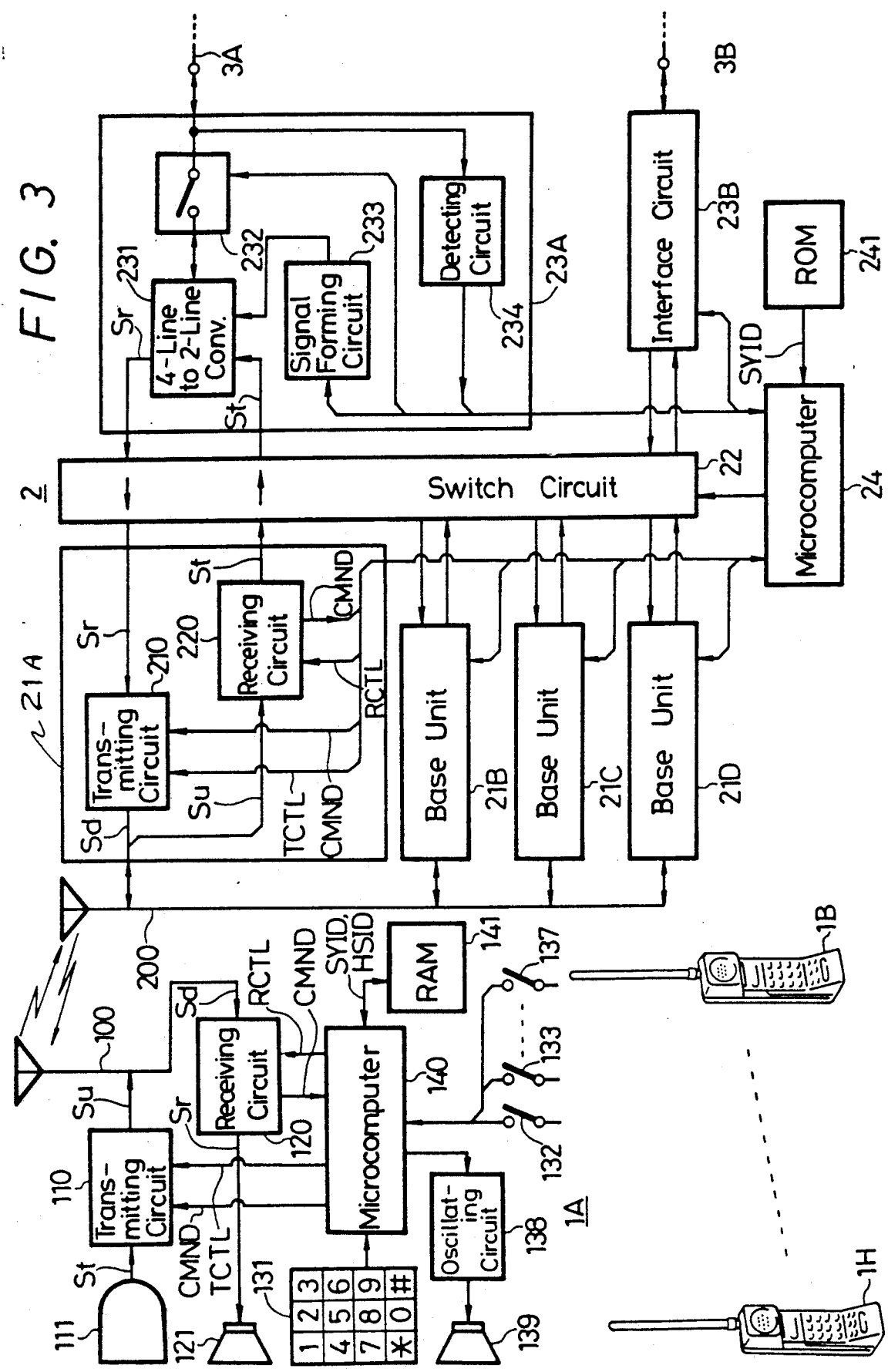
FIG. 3 is a block diagram of a cordless telephone which uses the present invention.

Referring now to the cordless telephone represented by the block diagram shown in FIG. 3, this telephone is adapted to be used in the system shown in FIG. 1 wherein a master station 2 is adapted to receive and transmit telephone calls via a telephone line 3 and communicate with any one of several remote handset units 1A-1H. FIG. 3 illustrates one embodiment of a typical handset used with this invention, such as handset unit 1A (also referred to herein as a remote station), and also illustrates in greater detail the embodiment of a base unit 21A and the embodiment of an interface circuit 23A provided at master station 2. The cordless telephone is provided with, for example, eighty-seven separate communication channels, or sets of carrier frequencies, and also is provided with two control channels, of which only one control channel is described. For increased flexibility and enhanced functions, master station 2 is provided with four base units 21A, 21B, 21C and 21D, of which base unit 21A is shown in greater detail, as mentioned above. It will be appreciated that each base unit is adapted to communicate with any one of handset units 1A-1H.

Still further, although master station 2 is adapted to process incoming and outgoing telephone calls over a single telephone line, the aforementioned desirability of improved flexibility and enhanced functions is aided by connecting two telephone lines to the master station, as represented by lines 3A and 3B.

Since the construction of handset units 1A-1H are substantially identical, only handset unit 1A is illustrated in detail. This handset unit includes a transmitting circuit 110, a receiving circuit 120, a keypad 131, a talk key 132, several function control keys 133-137 and a microcomputer 140. Transmitting circuit 110 is coupled to an antenna 100 to supply radio frequency energy thereto. In particular, the transmitting circuit functions to convert audio signals, such as audio signals St generated by a microphone 111, to suitable radio frequency energy. In this regard, transmitting circuit 110 preferably includes a frequency modulator to supply FM signals to antenna 100. The transmitting circuit also functions to convert command signals CMND supplied from microcomputer 140 to radio frequencies for transmission via antenna 100. As will be described, the command signals are digital signals adapted to be frequency modulated by conventional frequency shift keying (FSK) techniques. The FM audio and FM command signals are transmitted from antenna 100 to master station 2 as up channel FM signals Su.

Receiving circuit 120 is coupled to antenna 100 and is adapted to receive down channel FM signals Sd which are transmitted from master station 2. The received FM signals may be audio signals which are demodulated and supplied as audio signals Sr to a speaker 121. The received FM signals also may be command signals received as FSK signals; and receiving circuit 120 functions to demodulate and supply these command signals CMND to microcomputer 140.

Keypad 131, which may be analogous to a conventional keypad such as normally provided on tone-dialing telephones, is coupled to microcomputer 140. Keypad 131 may be operated in a conventional manner to generate telephone numbers and other identifying codes.

Talk key 132 may be a conventional nonlocking push switch which, when operated, supplies a suitable indicating signal to the microcomputer. As will be described, microcomputer 140 responds to the operation of talk key 132 to change the operating mode of handset unit 1A. For example, if the handset unit is disposed in a standby mode capable of receiving and processing command signals, the microcomputer responds to the activation of talk key 132 to establish an active mode, known as the "talk mode", whereby audio signals may be transmitted to and from the handset unit, thereby enabling a user to carry on a telephone conversation. Once in this talk mode, the subsequent activation of talk key 132 once again changes the operating mode of the handset unit to the standby mode. It will be appreciated that, in the standby mode, the microcomputer establishes either the receive mode or the quiescent (or sleep) mode for the handset unit, as discussed above in conjunction with FIG. 2A. That is, the microcomputer periodically changes over the handset unit from its quiescent mode to its receive mode, the latter being established for a brief interval of time (e.g. about 200 milliseconds).

Function control keys 133-137 are similar to talk key 132 in that they are nonlocking push switches. These keys function as internal keys to carry out various operations, such as to establish an intercom connection, to place a telephone call on "hold", to re-dial the last-dialed telephone number, to dial predetermined telephone numbers, and the like.

In addition to speaker 121, which functions as, for example, the earpiece of a telephone instrument, handset unit 1A includes a speaker 139 which is coupled to an oscillating circuit 138 which, in turn, is controlled by microcomputer 140. The oscillating circuit is adapted to drive speaker 139 to generate a ringing tone which represents an incoming telephone call.

Microcomputer 140 includes a microprocessor and, in one embodiment, may be implemented by Model MSM-80C51, produced by Oki Electric Company, Ltd. of Japan. The microcomputer is adapted to generate the command signal CMND which is transmitted to master station 2 as an up channel signal via antenna 100. Microcomputer 140 also is adapted to receive and interpret the command signal received from the master station as a down channel signal via antenna 100. In addition, transmit and receive control signals TCTL and RCTL are applied to transmitting circuit 110 and receiving circuit 120, respectively, to selectively enable or inhibit the operations of these circuits. These transmit and receive control signals also establish the particular communication channel over which handset unit 1A communicates with master station 2. That is, the particular transmit and receive carrier frequencies are determined by these control signals.

A random access memory (RAM) 141 is coupled to microcomputer 140 and is adapted to store various codes, control signals, identifying signals and the like which are used by the microcomputer, handset unit 1A and the illustrated cordless telephone system. For example, to distinguish the cordless telephone illustrated in FIG. 3 from another, similar cordless telephone, a system identification code is used to identify this system. As a numerical example, a 25-bit system identification code SYID is stored in RAM 141 to distinguish this cordless telephone system from others. Likewise, the particular handset with which RAM 141 is associated is distinguished from other handsets in the illustrated system. For the example wherein eight handset units are provided, a handset identification code HSID may be assigned to each unit such as, for simplification, HSID[1] may be assigned to handset unit 1A, HSID[2] may be assigned to handset unit 1B, and so on. It will be appreciated 11 that a handset unit will respond only when an identification code 12 HSID identifies that particular handset unit. To enable all handset units to be accessed simultaneously, a particular identification code may be used as a "universal" code, to which all of the handset units respond. For example, HSID[0] may be used as the universal identification code.

Referring to master station 2, base units 21A-21D are of similar construction and, in the interest of brevity, only base unit 21A is illustrated in detail. The base unit includes a transmitting circuit 210 coupled to an antenna 200 to transmit radio frequency signals to the handset unit. Audio signals Sr which are received from, for example, telephone line 3A, are frequency modulated (although other forms of modulation may be used) by transmitting circuit 210 and transmitted via antenna 200. In addition, a command signal CMND may be applied to the transmitting circuit for modulation and transmission to the remote handset units. Modulated command signals are transmitted as down channel FM signals Sd.

Receiving circuit 220 is adapted to receive and demodulate audio and command signals transmitted from the remote handset units. The demodulated audio signals St are supplied generally to a telephone line, such as line 3A, to carry on a telephone conversation with a calling or called party. The received command signals, which are transmitted as up channel FM signals Su, are supplied to a microcomputer 24 which controls the operation of master station 2.

Transmit and receive control signals TCTL and RCTL are supplied to transmitting circuit 210 and receiving circuit 220, respectively, by microcomputer 24. These transmit and receive control signals are similar to those described above in conjunction with handset unit 1A and selectively enable and inhibit the operations of transmitting circuit 210 and receiving circuit 220, as well as establish the communication channel (i.e. the carrier frequencies) for transmitting between base unit 21A and one of the remote handset units. It will be appreciated that the carrier frequency to which transmitting circuit 210 is tuned is equal to the carrier frequency to which receiving circuit 120 is tuned and, similarly, the carrier frequency to which receiving circuit 220 is tuned is equal to the carrier frequency to which transmitting circuit 110 is tuned.

The transmitting and receiving circuits included in base unit 21A are coupled through a switch circuit 22 to one or the other of interface circuits 23A and 23B. Switch circuit 22 is controlled by microcomputer 24 to select the appropriate interface circuit. In addition, and as will be described, the switch circuit functions to connect base unit 21A to any one of base units 21B and 21D to permit an intercom-type communication between two handset units.

Microcomputer 24 is coupled to base units 21A-21D, switch circuit 22 and interface circuits 23A and 23B for the purpose of controlling these respective units and circuits. The microcomputer may, for example, be a Model MSM-80C154, produced by Oki Electric Company, Ltd. of Japan. The manner in which the microcomputer operates will be described in detail below.

Interface circuits 23A and 23B are adapted to connect telephone lines 3A and 3B to switch circuit 22 and, thence, to a base unit selected by microcomputer 24. The interface circuits are substantially the same, and only interface circuit 23A is shown in detail. As illustrated, a 4-line to 2-line converter 231 is provided to match telephone line 3A with any one of base 23 units 21A-21D. This provides compatibility between 2-wire and 4-wire lines.

A switch 232, which is analogous to a conventional telephone hook switch, couples telephone line 3A to converter 231. Microcomputer 24 is coupled to switch 232 to control its on-hook or off-hook mode.

A signal forming circuit 233 is coupled to converter 231 and is controlled by microcomputer 24 to generate dialing signals which are applied to the telephone line. The dialing signals may be conventional tone signals, such as dual tone multi-frequency (DTMF) signals, or pulse signals. The mode (tone or pulse) and content (telephone number) of these dialing signals are determined by the microcomputer.

A ring detecting circuit 234 is coupled directly to telephone line 3A and is adapted to detect an incoming ringing signal. The output of detecting circuit 234 is coupled to microcomputer 24 to provide an indication thereto when an incoming telephone call has been placed to master station 2.

Microcomputer 24 is coupled to a read only memory (ROM) 241 which, inter alia, stores the system identification code SYID that identifies this particular cordless telephone system. The ROM also provides operating instructions to control the operation and function of microcomputer 24.

Figure 4:
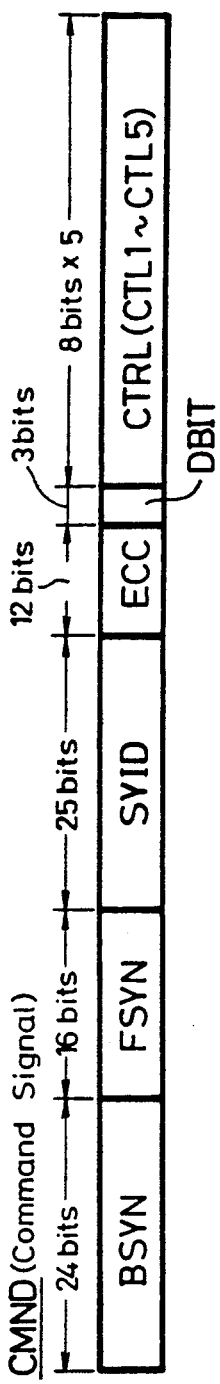
FIG. 4 is a schematic representation of the COMMAND signal structure used with the present invention.

Before describing the manner in which the cordless telephone system operates, reference is made to FIG. 4 which is a schematic representation of the signal structure of the command signal CMND that may be transmitted over the down channel from master station 2 to a remote handset unit, or transmitted over the up channel from a handset unit to the master station. The command signal includes a bit synchronizing signal BSYN of, for example, twenty-four alternating bits, such as [101010...], followed by a frame synchronizing signal FSYN formed of, for example, sixteen bits of a particular pattern for transmission over an up channel (i.e. from a handset unit to the master station) and exhibiting a different, distinctive pattern for transmission over a down channel from the master station to one or more remote handset units. Thereafter, the command signal includes a system identification code SYID of, for example, twenty-five bits, followed by an error correcting code (ECC) which is used in conjunction with the identification code SYID. The error correcting code may be formed of, for example, twelve bits, and this code is followed by a dummy bit DBIT of, for example, three bits. Finally, a 5-byte control code CTRL is provided.

The contents of control code CTRL are described in greater detail below. Suffice it to say that the control code is used to represent an incoming telephone call, to identify a handset unit for communication, to identify a communication channel over which information is communicated between the master and remote stations, to indicate an answer or response from a handset unit, to control the turn-on or turn-off of a ringing indication, to represent a polling of handset units, to represent a response to polling, to represent the actuation of particular switches or keys, etc.

When a command signal CMND of the type shown in FIG. 4 is applied to handset microcomputer 140 or to master station microcomputer 24, the system identification code SYID and handset identification code HSID are examined to determine if the respective codes are valid. That is, the identification code SYID must identify this particular cordless telephone system and the identification code HSID must identify the proper handset unit for which the command signal is intended. Only valid command signals (i.e. those having the proper SYID and HSID codes) are accepted and processed.

Figure 5:
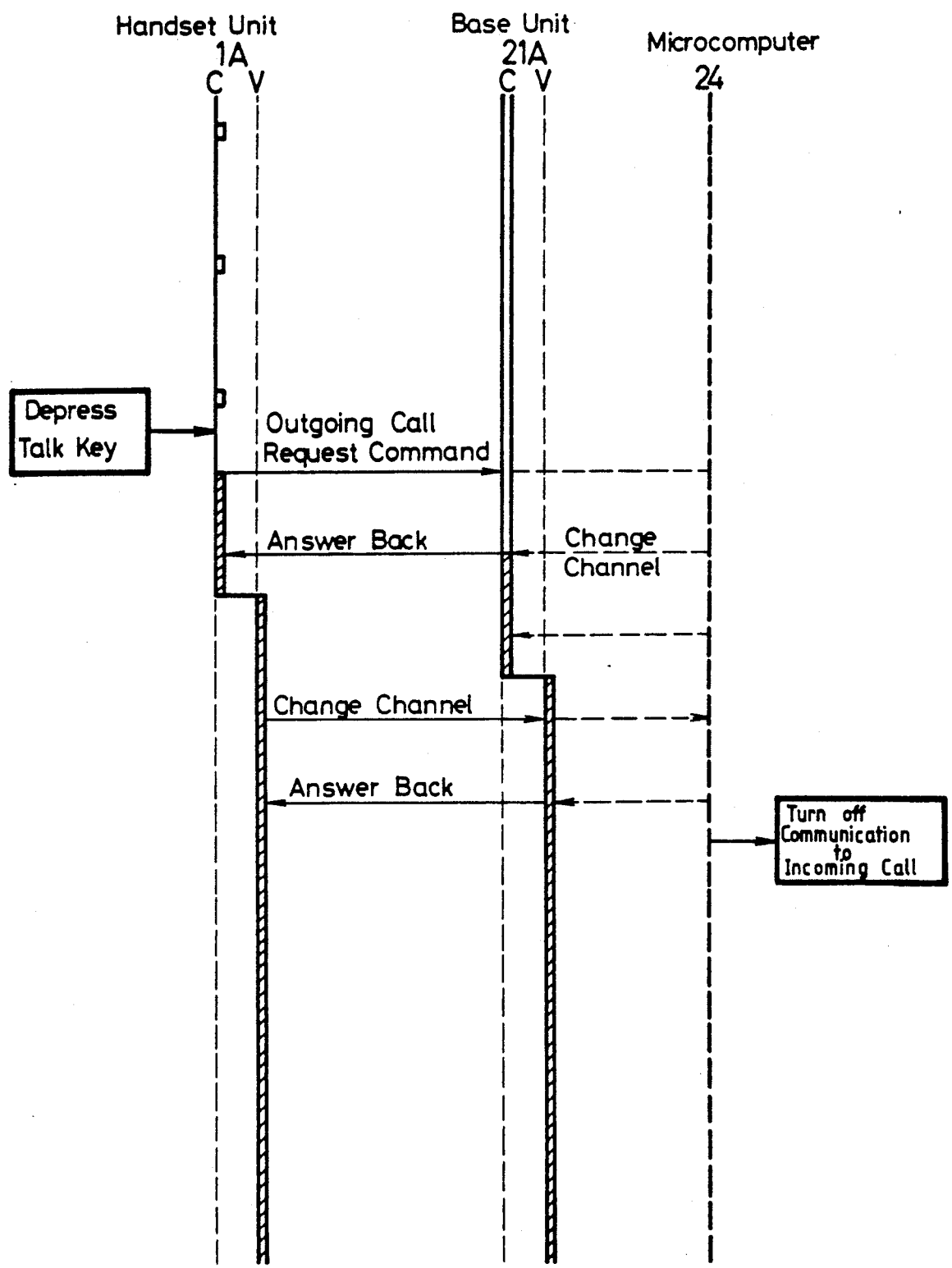
FIG. 5 is a schematic representation of the sequence in which signals are transmitted when initiating an outgoing telephone call with the cordless telephone shown in FIG. 3.

The manner in which an outgoing call is initiated from a remote handset unit 1A, 1B, ... 1H now will be described in conjunction with the sequence schematic diagram of FIG. 5. To best understand FIG. 5, it should be noted that a solid vertical line represents a channel over which information is transmitted and received by a handset unit and by a base unit, a control channel is represented by the vertical line C, a communication channel is represented by the vertical line V, a single solid line indicates the standby mode of a handset unit (which, as discussed above, periodically is changed over from a "sleep" mode to a receive mode), a double solid line represents the receive mode of a handset unit or base unit and a hatched double line indicates a talk mode such that the handset unit or the base unit, as the case may be, may receive and transmit. Progress in the vertical direction from top to bottom corresponds to a progression in time. It will be understood that this time relationship is neither linear nor drawn to any representative scale.

As illustrated, a handset unit which, for the purpose of the present description, is assumed to be handset unit 1A, normally is disposed in its standby mode and periodically enters its receive mode, as represented by the periodic pulses. A base unit, such as base unit 21A, normally is disposed in its receive mode and, thus, is capable of receiving command signals from the handset units. In response to the operation of talk key 132, microcomputer 140 supplies transmitting circuit 110 and receiving circuit 120 with transmit and receive control signals TCTL and RCTL, respectively, thereby enabling up channel signals Su to be transmitted and down channel signals Sd to be received. In response to the operation of the talk key, handset unit iA is disposed in its talk mode.

In addition, microcomputer 140 supplies a command signal CMND whose control code CTRL represents a request to make an outgoing telephone call and also identifies, with identification code HSID, the handset unit which seeks to make the outgoing telephone call. This command signal CMND is transmitted from handset unit 1A to base unit 21A over the up control channel.

Command signal CMND is received by antenna 200 at master station 2 and supplied to, for example, base unit 21A which presently is in its standby, receive mode. The received FM signal Su is demodulated by receiving circuit 220 to recover the command signal which is supplied to microcomputer 24. The microcomputer confirms that the identification code SYID identifies the proper cordless telephone system by, for example, comparing the received SYID code to the SYID code stored in ROM 241. Assuming that the received command signal CMND is valid, microcomputer 24 supplies the transmit control signal TCTL to transmitting circuit 210 which is enabled thereby to transmit signals Sd over the down control channel to handset unit 1A.

Microcomputer 24 also forms a command signal CMND whose control code CTRL represents confirmation that the requesting handset unit may initiate an outgoing telephone call. The control code also includes a handset identification code HSID to identify handset unit 1A as the unit authorized to initiate the outgoing telephone call, as well as a channel number code to assign a particular communication channel over which information is communicated between the base unit and the handset unit. This command signal CMND is supplied to and transmitted by transmitting circuit 210 and is illustrated in FIG. 5 as the "answer back" signal transmitted as an FM down control channel signal Sd.

When this FM signal Sd is received by receiving circuit 120 of handset unit 1A, the command signal CMND is demodulated and supplied to microcomputer 140. Here, the identification codes SYID and HSID included in the received command signal CMND are verified, whereupon microcomputer 140 sets the carrier frequencies of the transmitting and receiving circuits to the communication channel assigned by the received command signal.

At the time that microcomputer 24 supplies the command signal to transmitting circuit 210, it also supplies transmit and receive control signals TCTL and RCTL to transmitting and receiving circuits 210 and 220, respectively, to set the carrier frequencies therein to those which correspond to the channel number assigned by the microcomputer for communication. In addition, base unit 21A is disposed in its talk mode. The step increase illustrated in FIG. 5 represent the changeover from the control channel to the assigned communication channel in both the handset unit and the base unit. Thus, a communication channel is extended, or opened, between handset unit 1A and base unit 21A. Although the remaining handset units 1B-1H receive the frequency modulated command signal from the base unit, these remaining handset units are maintained in their standby mode of operation because the handset unit identification code HSID received at each unit does not match its respective HSID code. Thus, the microcomputers included in such remaining handset units do not initiate any change in the operating conditions thereof.

Following the reception at handset unit 1A of the command signal which authorizes the handset unit to initiate an outgoing telephone call and which assigns the selected communication channel thereto, microcomputer 140 forms a command signal CMND in which the control code CTRL identifies the carrier frequencies to which transmitting and receiving circuits 110 and 120 have been set. This command signal is transmitted to base unit 21A as an FM up channel signal Su over the assigned communication channel. Confirmation that the handset and base units are connected to the same communication channel is returned to the handset unit by base unit 21A as yet another command signal CMND transmitted as a down channel FM signal over this assigned communication channel.

Once the communication channel is established between handset unit 1A and base unit 21A, microcomputer 24 selects an available interface circuit by which outgoing telephone communication may be extended to telephone line 3A or 3B. Let it be assumed that interface unit 23A is not active, for example, switch circuit 232 is in its on-hook condition, whereupon the microcomputer controls switch circuit 22 to connect base unit 21A to interface circuit 23A. Consequently, converter 231 is coupled to transmitting and receiving circuits 210 and 220 of base unit 21A. Therefore, when switch circuit 232 is disposed in its off-hook condition, handset unit 1A is connected by way of the established communication channel to base unit 21A and thence through switch circuit 22 to interface circuit 23A to telephone line 3A.

The user of handset unit 1A now may dial a desired telephone number by operating keypad 131. Microcomputer 140 responds to the operation of this keypad to form a command signal whose control code represents the telephone number to be called and also provides an indication that a telephone call operation is being carried out. This command signal is frequency modulated and transmitted as FM signal Su over the assigned communication channel to base unit 21A whereat the command signal is demodulated and supplied to microcomputer 24. In response to the control code of this command signal, the microcomputer operates signal forming circuit 233 to transmit tone or pulse dialing signals to telephone line 3A.

When the called party answers this outgoing telephone call, audio information Sr from that party is supplied over telephone line 3A, switch circuit 232, converter 231 and switch circuit 22 to transmitting circuit 210. These audio signals are frequency modulated and transmitted over the assigned communication channel from base unit 21A to handset unit 1A, whereat the audio signal is demodulated by receiving circuit 120 and supplied as audio signal Sr to speaker 121. Similarly, when the user of handset 1A speaks, microphone 111 supplies audio signals St to transmitting circuit 110 which frequency modulates those audio signals and transmits them to base unit 21A over the assigned communication channel. The FM audio signals are received and demodulated by receiving circuit 220, supplied through switch circuit 22 to converter 231 and applied to telephone line 3A via switch circuit 232. Thus, a telephone conversation may be carried on between the user of handset unit 1A and the called party.

Figure 6:
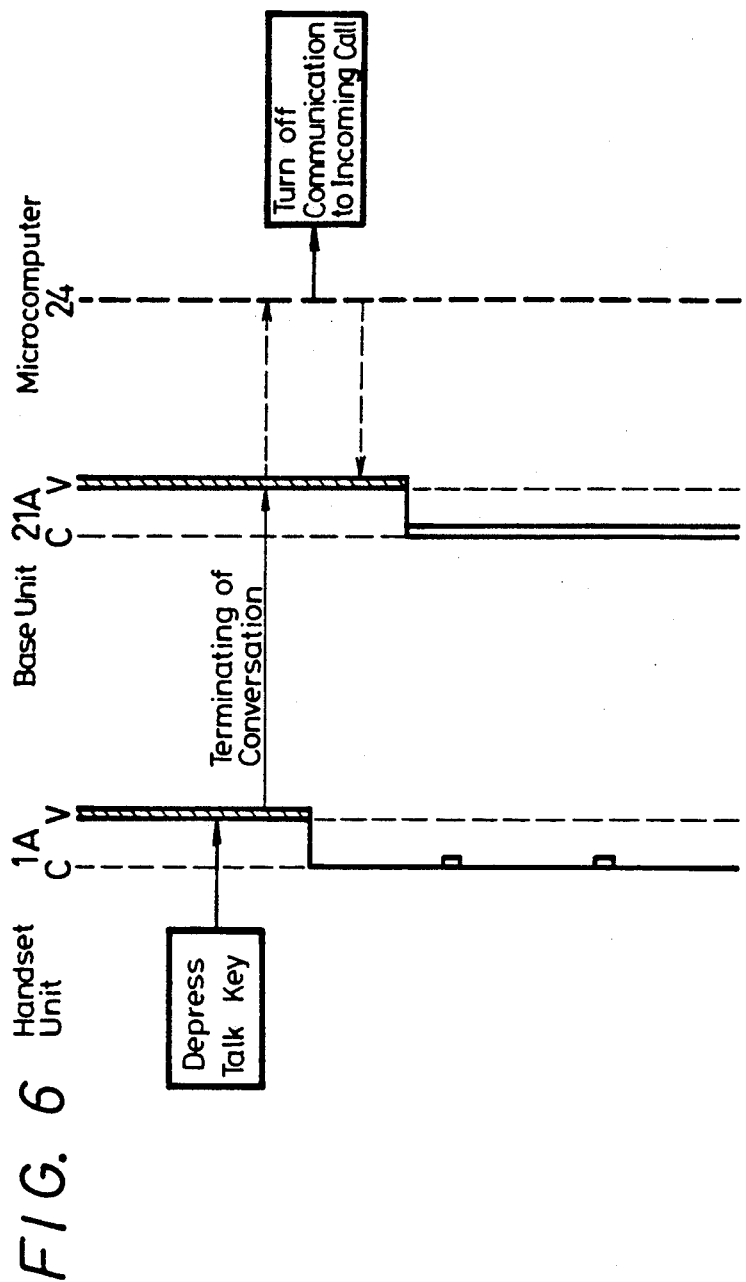
FIG. 6 is a schematic representation of the manner in which an outgoing telephone call is terminated by the cordless telephone shown in FIG. 3.

FIG. 6 is a schematic sequential representation of the manner in which the aforementioned outgoing telephone call is terminated. When the user of handset unit 1A operates talk key 132, microcomputer 140 responds thereto to form a command signal representing that the telephone conversation with this particular handset unit (its identification code HSID is included in the command signal) has terminated. This command signal is transmitted as the FM signal Su over the assigned communication channel to base unit 21A. Receiving circuit 220 demodulates and applies this received command signal to microcomputer 24 which determines therefrom that the telephone conversation has ended. Accordingly, the microcomputer operates switch circuit 232 to return to its on-hook state. Also, transmit and receive control signals TCTL and RCTL are applied to transmitting and receiving circuits 210 and 220 to inhibit the transmitting circuit but enable the receiving circuit to receive up channel signals that may be supplied subsequently from a handset unit. Thus, as illustrated in FIG. 6, base unit 21A is disposed in its standby mode.

In addition, microcomputer 140 responds to the operation of talk key 132 to supply the transmit and receive control signals TCTL and RCTL to transmitting and receiving circuits 110 and 120, whereby the transmitting circuit is inhibited and the receiving circuit is enabled to receive down channel FM signals. The handset unit is disposed in its standby mode, which alternates between brief periods of the aforementioned receive mode and prolonged periods of the "sleep" mode.

Figure 9A:
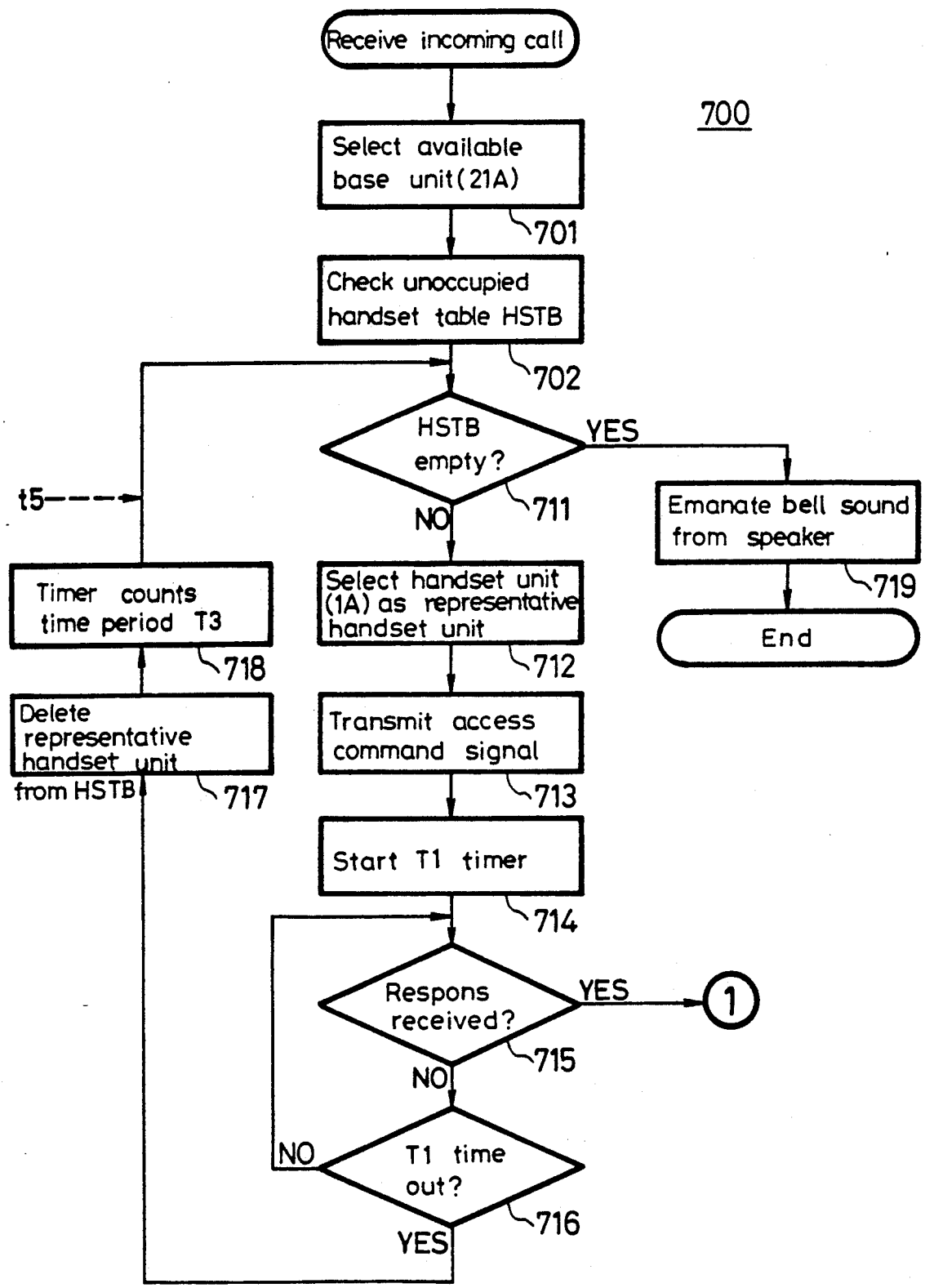
Figure 10A:
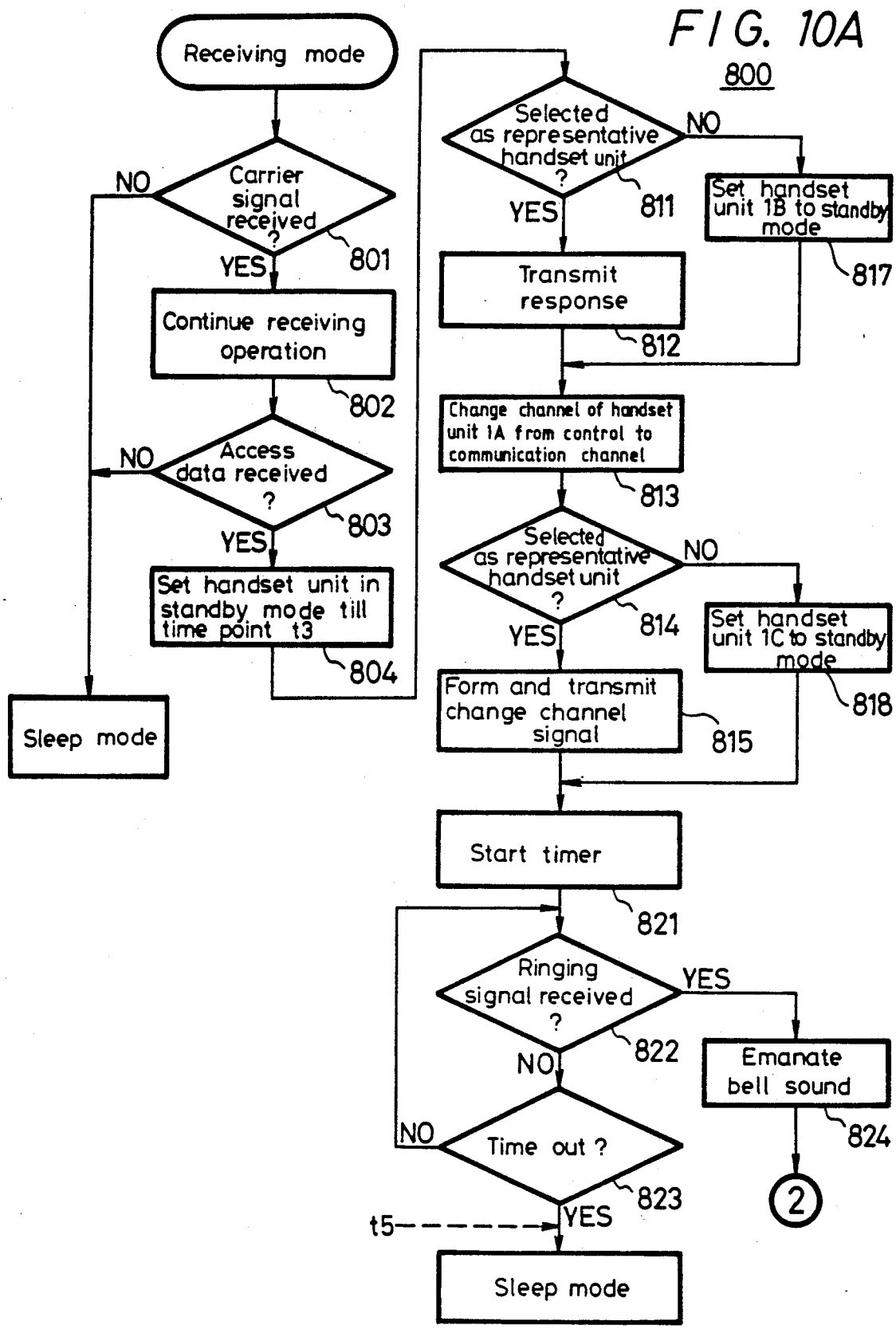
FIGS. 10A and 10B represent a flow chart which explains the manner in which the remote station of FIG. 3 operates to "answer" an incoming telephone call.
Figure 10B:
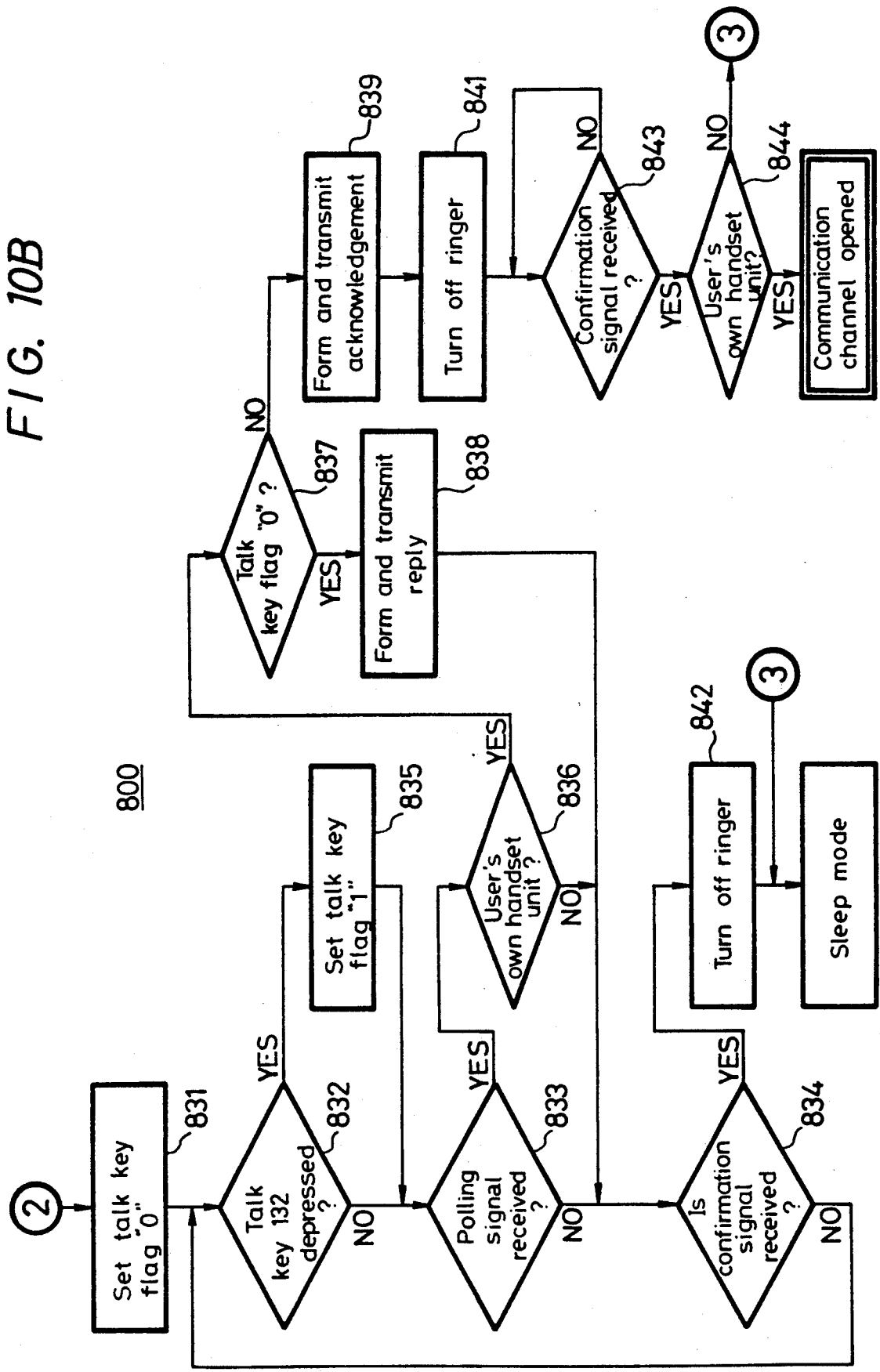

The manner in which an incoming call is received from a telephone line and extended to a remote handset unit now will be described in conjunction with the schematic sequence representation of FIGS. 7A and 7B, the flow chart representing the operation of microcomputer 24, as shown in FIGS. 9A and 9B, and the flow chart representing the operation of microcomputer 140, as represented by FIGS. 10A and 10B. It will be appreciated that these routines illustrated by the flow charts are stored in suitable ROM's connected to respective microcomputers.

For the purpose of explanation, it is assumed that interface unit 23A is selected, and that switch circuit 22 functions to connect base unit 21A with interface circuit 23A.

When an incoming telephone call is received over telephone line 3A, the usual ringing signal is detected by detecting circuit 234 to supply microcomputer 24 with an indication of an incoming telephone call. In response to this indication, the microcomputer executes routine 700 illustrated in FIGS. 9A and 9B. Initially, the microcomputer carries out instruction 701 whereby an available base unit is selected. As assumed herein, base unit 21A is in its standby mode and, thus, is selected by the microcomputer. Hence, transmitting circuit 210 is enabled to transmit down channel signals Sd over antenna 200.

The microcomputer then advances to instruction 702 to check an available handset table HSTB to determine whether any of handset units 1A-1H are available to receive the incoming telephone call. Those handsets which are available are identified, by way of their identification codes HSID, in handset table HSTB. Examples of those handset units which are not available for communication are those which are actively communicating with master station 2 or those which have previously been found to be unavailable. The identification codes of those unavailable handset units are not included in the handset table.

The routine then advances to inquiry 711 to determine whether the handset table HSTB is empty. If this inquiry is answered in the affirmative, thus indicating that none of handset units 1A-1H is available for receiving the incoming telephone call, the microcomputer advances to instruction 719 which provides a suitable indication of the unavailability of any handset units in the cordless telephone system. Thereafter, the microcomputer returns to its standby mode and does not answer the incoming telephone call.

However, if one or more handset units is available to receive the incoming telephone call, inquiry 711 is answered in the negative and the microcomputer advances to instruction 712. Here, a desired one of the handset units whose identification code is listed in table HSTB is selected as a representative handset unit. In accordance with the present assumption, handset unit 1A is designated as the representative handset unit; and the routine advances to instruction 713 to form and transmit a suitable command signal which represents that an incoming telephone call is being received, which includes the identification code HSID of the designated representative handset unit, and which identifies a particular communication channel over which audio communication will be established between the base unit and a remote unit. This command signal, referred to herein as an access signal, or access data, is transmitted over the down control channel to all of the remote handset units, as represented in the interval t1-t3 of FIG. 7A. As an example, this access command signal may be transmitted repeatedly, such as shown in FIG. 2B. As also shown in FIG. 7A, when this command signal is received by each of the handset units, each unit remains in its receive mode, as represented by the broken line in FIG. 2A and as also represented by the double vertical lines associated with handsets 1A, 1B, . . . 1H in FIG. 7A.

At the completion of the transmission period for this command signal, that is, at time t3, routine 700 advances to instruction 714 to start timer T1. The purpose of this timer is to determine whether a response to the access signal is received by the base unit from the designated representative station. Thus, following the initiation of the T1 timer, the routine advances to inquiry 715 to determine if a response has been received and, if not, inquiry 716 is made to determine if the T1 timer has timed out. The microcomputer cycles through the loop formed of inquiries 715 and 716 until either the timer has timed out or a response is received from the designated representative handset. If a response is timely received, thus indicating that the handset unit which has been designated as the representative unit is capable of receiving the incoming telephone call, inquiry 715 is answered in the affirmative and the routine advances to instruction 721, shown in FIG. 9B.

At instruction 721, microcomputer 24 supplies transmit and receive control signals TCTL and RCTL to transmitting and receiving circuits 210 and 220, respectively, to change over the channel to which these circuits are tuned from the control channel which had been used to transmit access data to the handset units to the communication channel which is identified in that access data. Thereafter, the routine advances to instruction 722 to initiate a T2 timer, whereupon the microcomputer cycles through the loop formed of inquiries 723 and 724. It is appreciated that this loop awaits the reception of a confirmation command signal from the representative handset unit (assumed herein to be handset unit 1A) that the remote unit has, indeed, set its transmitting and receiving circuits 110 and 120 to operate at the communication channel identified in the access data. If this confirmation command signal is received before the T2 timer times out, inquiry 723 is answered in the affirmative and the routine advances to instruction 731. However, if this confirmation command signal is not received within the period T2, the microcomputer advances to instruction 725 to reset base unit 21A to its standby mode, thus conditioning receiving circuit 220 to receive up channel signals Su that may be transmitted subsequently from a remote handset unit. Once base unit 21A is disposed in its standby mode, microcomputer 24 exits this routine.

Assuming that confirmation is received from the designated representative handset unit that it is connected to the assigned communication channel, as represented by the "confirmation of changed channel" returned from handset unit 1A to base unit 21A in FIG. 7A, instruction 731 is carried out to transmit from the base unit a handset ringing signal command. As shown in FIG. 7A, this ringing signal command is returned to all available handset units, that is, to those remote stations whose identification codes HSID are stored in the handset table HSTB, from base unit 21A over the selected communication channel. At this time, all of the available handset units are connected to this communication channel and are disposed in a receive mode. Consequently, and as will be described below in connection with the flow chart shown in FIGS. 10A and 10B, ringing circuits similar to oscillating circuit 138 and speaker 139 of handset unit 1A, are energized. Ringing indications thus are provided at these remote stations, representing the receipt of an incoming telephone call. These ringing indications apprise a human operator at any one or more of these handset units that a telephone call has been made to the cordless telephone system.

Following the transmission of this ringing signal command, the routine advances to instruction 732, whereupon microcomputer 24 forms a polling command signal which includes a respective HSID code read from handset table HSTB, together with another control signal which invites a reply from the polled remote station. Receipt of the polling command signal disposes the remote handset unit in its talk mode to enable a reply to be returned to the base unit.

Microcomputer 24 then advances to inquire, at 733, if a reply command signal is received from the particular polled handset unit, that is, the handset unit identified by the HSID code read from handset table HSTB. A reply command, designated as an "answer back reply" in FIG. 7A, includes the handset identification code HSID of the replying handset unit as well as an indication of whether its talk key 132 has been operated. If inquiry 733 is answered in the negative, that is, if a reply indicating the operation of the talk key is not received from the polled handset unit, the routine advances to inquire, at 734, if the incoming ringing signal still is present on telephone line 3A. If not, that is, if the calling party has hung up, inquiry 734 is answered in the negative and the microcomputer advances to instruction 725 to condition base unit 21A to its standby mode. But, if the incoming ringing signal still is present, inquiry 734 is answered in the affirmative and the routine advances to instruction 735 to read the next handset identification code HSID from the handset table HSTB. Then, instruction 732 is repeated.

Thus, the routine cycles through a loop by which each successive handset unit is polled to determine if the talk key thereat has been operated. FIGS. 7A and 7B illustrate the polling of several handset units, each of which replies to the polling signal sent thereto with an indication that the talk key thereat has not been operated. This polling continues, cyclically, until an operator depresses the talk key at a particular handset unit, such as handset unit 1C, signifying that he wishes to answer the incoming telephone call. When that handset unit next is polled, the reply returned to the base unit in response to this polling indicates that the talk key has been operated and is referred to as an acknowledgment. It is, of course, appreciated that any available handset unit may acknowledge the polling operation if the talk key thereat is operated. Such acknowledgment is not limited solely to the designated representative unit.

When an acknowledgment is received from the polled handset unit, inquiry 733 is answered in the affirmative. Routine 700 then advances to instruction 741, whereby microcomputer 24 controls switch 232 to its off-hook condition, whereupon telephone line 3A is connected to base unit 21A. The microcomputer also controls switch circuit 22 to connect transmitting and receiving circuits 210 and 220 of base unit 21A to converter 231 and thence via switch 232 to telephone line 3A.

Next, the routine advances to instruction 742 to form and transmit to all of the handset units a command signal including the identification code HSID of the acknowledging handset unit, thereby indicating that this particular remote station has been set to communicate with base unit 21A. At each remote station, the HSID code received from base unit 21A is compared to the identification of that particular station, and at the one station whereat these HSID codes match, that one station remains in its talk mode to communicate with the base unit. At all other stations where there is not a match of the HSID codes, those stations are returned to their standby mode; and this results in the turning off of the call indicators at each of those remote stations. (FIG. 7B further illustrates that the acknowledgment returned from, for example, handset unit 1C in response to the polling thereof after its talk key has been operated is accompanied by the deenergization of the call indicator at that handset unit.) Thereafter, microcomputer 24 extends, or opens, the communication channel between the confirmed handset unit (e.g. handset unit 1C) and base unit 21A.

In the foregoing discussion, it has been assumed that the designated representative station whose identification code HSID is included in the access data transmitted from base unit 21A to all of the handset units had responded to that access data. That is, it has been assumed that inquiry 715 of FIG. 9A has been answered in the affirmative. If, however, no response is detected from the designated representative station so that timer T1 times out, inquiry 716 is answered in the affirmative and microcomputer 24 advances to instruction 717. This possible condition is represented by the schematic sequence representation shown in FIG. 8.

Figure 8:
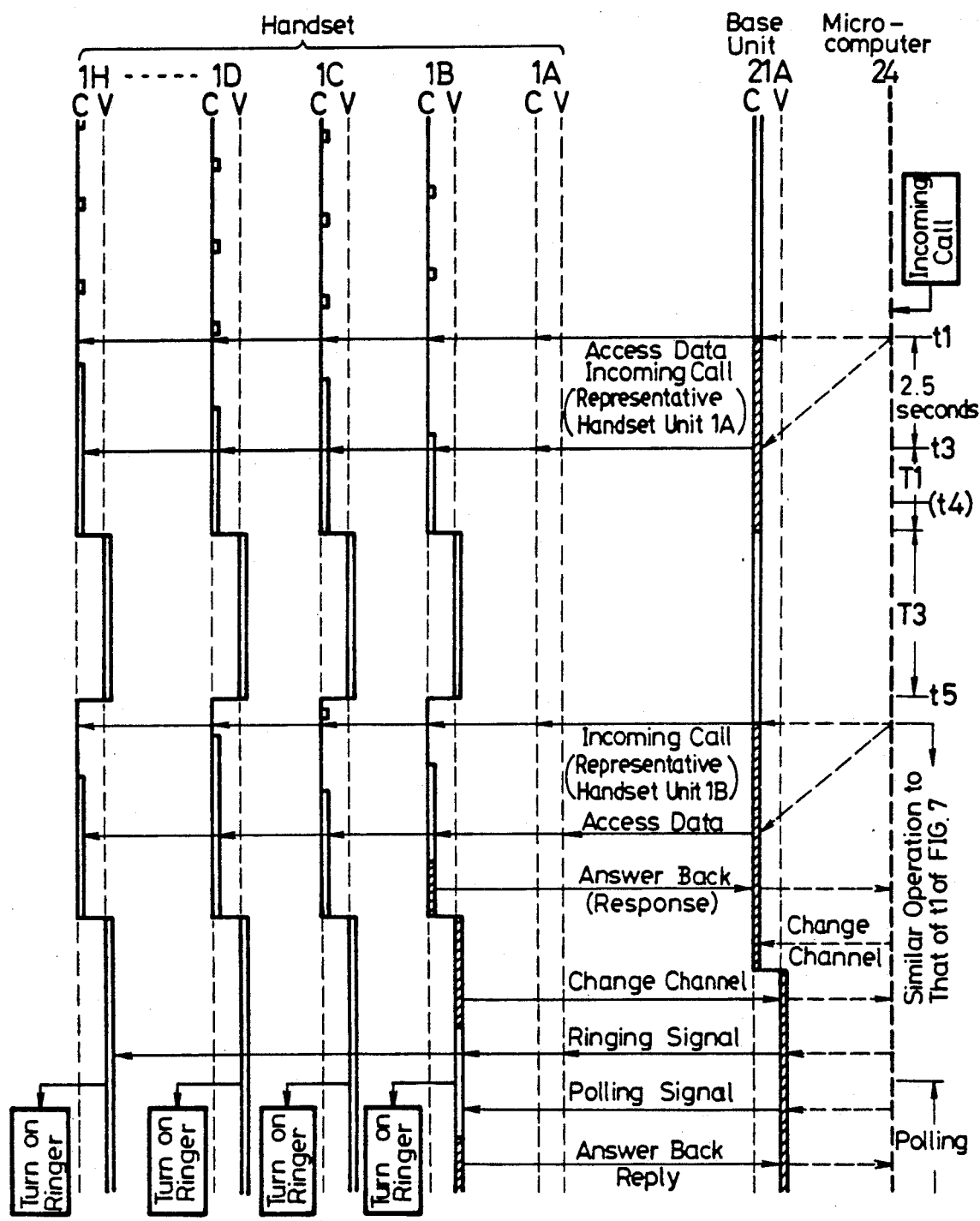
FIG. 8 is a schematic representation of another example of the sequence in which signals are transmitted in accordance with the present invention.

In FIG. 8, it is assumed that access data is transmitted from base unit 21A to all of the handset units and, as before, this access data includes the identification code HSID of a particular handset unit which is designated as the representative station. As before, receipt of this access data disposes the remote stations in their respective receive modes, represented by the broken line of FIG. 2A. However, assuming that handset unit 1A continues to be the designated representative station, this unit does not return a response to the base unit because, for example, it may be inoperative, it may exhibit a low battery condition, it may be outside the effective communication range of base unit 21A, or the like. Nevertheless, even in the absence of a response to the access data from the designated representative station, the remaining handset units change over from the control channel to the communication channel identified in the access data, while remaining in their receive modes in anticipation of receiving the ringing signal command from the base unit. At this time, the ringing signal command is not transmitted because of the failure of the designated representative station to respond to the access data.

Accordingly, microcomputer 24 carries out instruction 717 which deletes from the handset table HSTB the identification code HSID of the handset unit which had previously been designated the representative station and which had not responded to the access data. In the present example, the identification code of handset unit 1A is deleted from this table.

Next, instruction 718 is carried out whereby a timing operation is executed to establish a delay period T3, shown in FIG. 8. At this time, base unit 21A is disposed in its standby mode and is conditioned to receive up channel signals Su that may be transmitted thereto from a remote handset unit. At the completion of this period T3, that is, at time t5, microcomputer 24 returns to inquiry 711, whereafter the aforedescribed routine is repeated.

At time t5, all of the handset units are changed over from the receive mode to the standby mode shown in FIG. 2A; and also are reconnected to the control channel. The cordless telephone system once again transmits access data to all of the remote units; but now, the identification code HSID identifying the designated representative station is read from the handset table HSTB as the next available handset unit. That is, when instruction 712 is carried out, handset unit 1B, for example, is identified as the designated representative station. Thus, following time t5, the sequence of operations illustrated in FIG. 8 is the same as the sequence of operations discussed above in conjunction with FIGS. 7A and 7B.

It is appreciated that the designation of the representative station is changed in sequence, by reason of the loop formed of instructions 711-718, until a designated representative station eventually responds to the access data by returning an "answer back response" to base unit 21A. This response must be received before time T1 times out. If so received, the ringing signal command is transmitted to all of the remote units and, when one of those units wishes to answer the incoming telephone call, the talk key thereat is operated so as to return an acknowledgment signal to the base unit when that handset unit is polled. Thereafter, the communication channel identified in the access data is established, or opened, between the acknowledging handset and the base unit.

The foregoing description of FIGS. 7A and B, 8, 9A and 9B has explained the operation of microcomputer 24 located at master station 2. The following describes the operation of microcomputer 140 located at a typical handset unit as it responds to an incoming telephone call. FIGS. 10A and 10B illustrate a flow chart representing the operation of this microcomputer.

Figure 2:
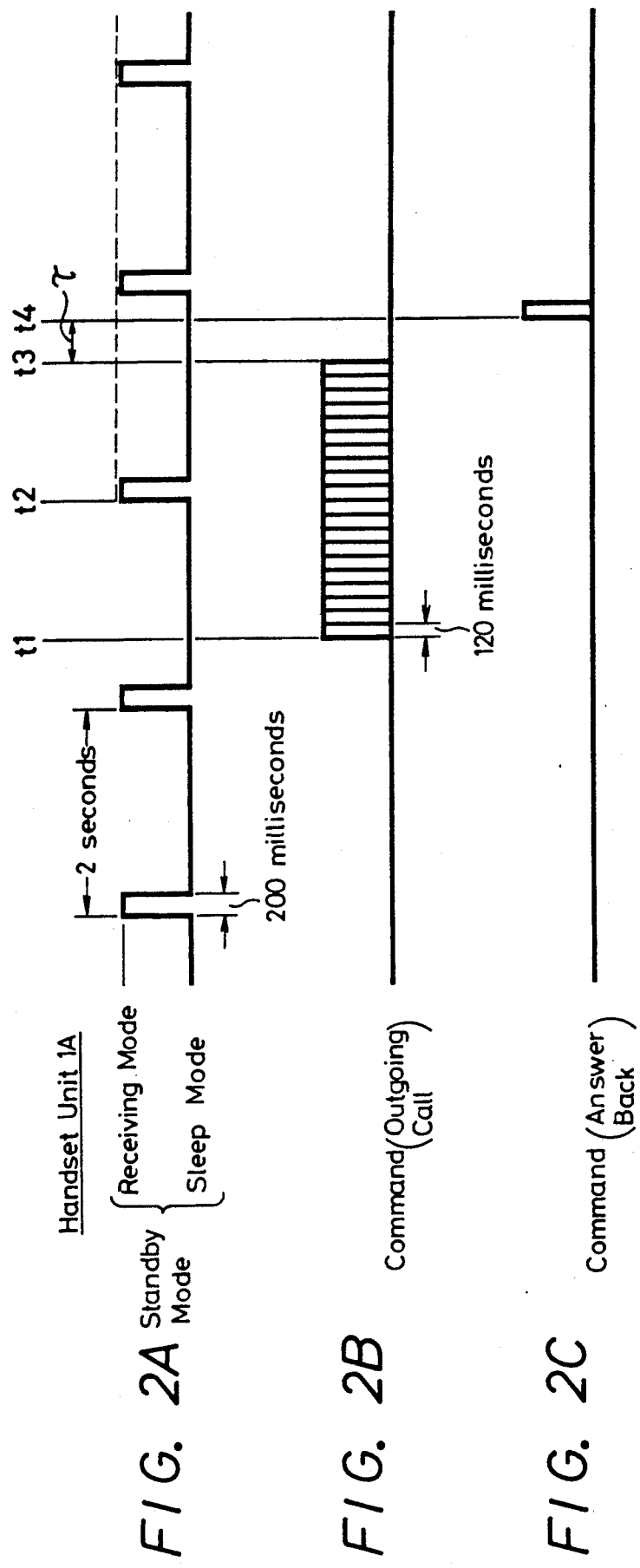
FIGS. 2A-2C are timing diagrams which are helpful in understanding the manner in which a communication channel is established between a master station and a handset unit in the system shown in FIG. 1.

As shown in FIG. 7A, and as previously described with respect to FIG. 2, each handset unit disposed in the standby mode enters the receive mode periodically, for a brief period of time. FIG. 10A represents the routine carried out by microcomputer 140 when in the receive mode. Initially, the routine advances to inquiry 801 to determine if a carrier signal has been received by receiving circuit 120. At this time, it is merely the presence of a carrier signal that is sensed, and not the informational content thereof. If no down channel signal is received, a carrier is not detected and inquiry 801 is answered in the negative. Accordingly, the handset unit merely returns to its quiescent (or "sleep") mode as shown by the pulses in FIG. 7A. Hence, the handset unit periodically changes over from its "sleep" mode to its receive mode for the purpose of sensing the presence of a carrier.

If inquiry 801 is answered in the affirmative, that is, if a carrier signal is detected, microcomputer 140 advances to instruction 802 to maintain receiving circuit 120 in its receive mode. The handset unit thus is enabled to receive and detect additional information that may be transmitted thereto. Then, the routine inquires, at 803, if the access data command signal is received. It is recalled that this command signal indicates that an incoming telephone call is being received at master station 2 and includes the identification code HSID of the designated representative handset unit, and also the identification of the communication channel assigned for communication with the base unit. It is this latter data that determines the communication channel to which the base and handset units are connected. If inquiry 803 is answered in the negative, microcomputer 140 returns the handset unit to its "sleep" mode.

However, if access data is received, inquiry 803 is answered in the affirmative and the routine advances to instruction 804 which maintains the handset unit in its receive mode, as represented by the broken line in FIG. 2A, until time t3. At that time, the transmission of the access code command signal terminates. Then, the routine inquires, at 811, if the identification code HSID received in the access data command signal identifies the handset unit at which microcomputer 140 is located (referred to, for convenience, as the user's handset). If this particular handset unit, that is, the user's handset unit, is the designated representative station, the microcomputer advances to instruction 812 to form the response (or "answer back") command signal, apply same to transmitting circuit 110 and transmit that response to base unit 21A over the presently existing control channel. As mentioned above, this response command signal includes the identification code HSID of the user's handset. From FIG. 7A, it is seen that this response command signal is returned to the base unit at time t4.

The microcomputer then advances to instruction 813 and supplies the transmit and receive control signals TCTL and RCTL to transmitting and receiving circuits 110 and 120 to tune these circuits to the communication channel identified in the received access command signal. Then, inquiry 814 determines if this handset unit has been designated as the representative handset unit. It is appreciated that inquiry 814 is substantially similar to previously described inquiry 811. If the identification code for this handset unit matches the identification code HSID in the received access data, inquiry 814 is answered in the affirmative and the routine advances to instruction 815.

Here, microcomputer 140 forms the confirmation of changed channel command signal which is returned to base unit 21A over the communication channel to which the transmitting and receiving circuits have been tuned, to confirm that this communication channel is the one identified in the access data command signal. It is recalled that this confirmation command signal is detected at the master station in inquiry 723, discussed above.

After this confirmation command signal has been transmitted, the routine advances to instruction 821 to initiate a timer which times out at time t5. While this timer is operating, inquiry 822 determines if a ringing signal command has been transmitted from master station 2. If not, the microcomputer cycles through the loop formed of inquiries 822 and 823 until either the timer times out, whereupon the microcomputer returns the handset unit to its "sleep" mode, or the ringing signal command is received. Assuming that this command is received, inquiry 822 is answered in the affirmative and instruction 824 is executed to energize the ringing circuit formed of oscillating circuit 138 and speaker 139. Thus, a ringing indication is provided at this handset unit.

The foregoing has assumed that microcomputer 140 is located at the designated representative station. If, in fact, the handset unit is not the representative station but, nevertheless, is an available, operative handset unit (i.e. it is not presently in use, it is supplied with sufficient battery power, it has not malfunctioned, it is within the communication range of base unit 21A, etc.), then all of the aforementioned inquiries and instructions are executed, except as follows: inquiry 811 is answered in the negative, whereupon the microcomputer advances to instruction 817 to maintain this handset unit in its standby receive mode by which it is enabled to receive command signals from the base unit. Instruction 812 is bypassed and, thus, this handset unit does not transmit the "answer back" response to the base unit. Nevertheless, instruction 813 is executed to connect this handset unit to the communication channel identified in the access data command signal that had been transmitted by base unit 21A.

Likewise, inquiry 814 is answered in the negative such that the routine bypasses instruction 815 and executes instruction 818 to maintain this handset unit in its standby receive mode.

Thus, when an "answer back" response is returned to the master station from the designated representative station, the ringing signal command which then is transmitted from the master station over the selected communication channel to all of the available handset units is able to energize their ringing circuits. Of course, in the absence of an "answer back" response from the designated representative handset unit, the ringing signal command is not transmitted.

After the ringing circuit in the handset unit is energized, as represented by instruction 824, the microcomputer advances to instruction 831, shown in FIG. 10B. Here, a talk key flag is reset to, for example, a binary "0". This flag indicates whether the talk key at the handset unit has been operated. A reset talk key flag indicates that the talk key has not been pressed. Then, inquiry 832 determines whether the talk key has, in fact, been operated. If so, instruction 835 sets the talk key flag to a "1". But, if the talk key has not been operated, inquiry 832 is answered in the negative and the routine advances to inquiry 833.

At inquiry 833, it is determined if a polling command signal is received from the master station. It is recalled that the polling command signal includes an identification code HSID read from handset table HSTB. If inquiry 833 is answered in the affirmative, the microcomputer advances to inquire, at 836, if the identification code HSID included in the polling command signal identifies this particular handset unit. If not, or if the polling command signal is not received, the routine advances to inquire, at 834, if a confirmation signal, such as transmitted by instruction 742, is received. If this inquiry is answered in the negative, as it now is, the routine returns to inquiry 832 and cycles through the loop formed of inquiries 832-834. It will be appreciated that microcomputer 140 at each handset unit cycles through this loop as the master station polls the handset units.

When the identification code HSID included in the received polling command signal identifies this handset unit, inquiry 836 is answered in the affirmative and the microcomputer inquires, at 837, if the talk key flag remains reset at "0". If talk key 132 at this handset unit is not operated, inquiry 837 is answered in the affirmative and instruction 838 is executed to transmit an "answer back" reply to the master station which includes an indication that the talk key has not been operated and which further includes the identification code HSID of this particular handset unit. Then, inquiry 834 is made and the routine cycles through the aforementioned loop formed of inquiries 832-834.

Thus, it is seen that, as base unit 21A polls the respective handset units in sequence, although the polling command signal may be received simultaneously by all such handset units, a reply is returned to the base unit only from the particular handset unit that is identified by the identification code HSID included in the polling command signal. If the talk key at each polled handset unit is not operated, the talk key flag remains reset at "0" and this information is returned to the master station.

Let it be assumed that the handset unit for which the flow chart shown in FIGS. 10A-10B is provided is handset unit 1C. Let it be further assumed that handset unit 1A is the designated representative station. Let it also be assumed that talk key 132 at handset unit 1C is operated. Hence, when the microcomputer cycles through the loop formed of inquiries 832-834, inquiry 832 is answered in the affirmative and the talk key flag is set to a "1". Then, when the polling command signal whose identification code HSID identifies handset unit 1C is received, inquiries 833 and 836 both are answered in the affirmative and inquiry 837 now is answered in the negative. Consequently, instruction 839 is executed and the acknowledgment is formed representing that the talk key has been operated and identifying handset unit 1C as the unit at which this talk key has been operated. This acknowledgment is returned to base unit 21A over the selected communication channel, as illustrated schematically at the bottom portion of FIG. 7B.

Microcomputer 140 then advances to instruction 841 to deenergize the ringing circuit located at handset unit 1C. Thereafter, inquiry 843 determines if a confirmation command signal has been received from base unit 21A, as is transmitted by instruction 742 (FIG. 9B). Microcomputer 140 cycles through inquiry 843 until a confirmation command signal has been received. Then, inquiry 844 determines if the identification code HSID included in this confirmation command signal identifies this particular handset unit, that is, handset unit 1C. If so, handset unit 1C is connected to the selected communication channel to communicate with the calling party who originally placed the incoming telephone call to the cordless telephone system. That is, transmitting and receiving circuits 110 and 120 are enabled to continue the transmission and reception of FM signals.

But, if inquiry 844 is answered in the negative, that is, if the confirmation command signal which is transmitted by base unit 21A includes an identification code HSID that identifies another handset unit, microcomputer 140 disposes handset unit 1C in its "sleep" mode.

From the foregoing description, it is seen that instruction 839 is reached by microcomputer 140 only if the identification code in a received polling command signal identifies this particular handset unit and the talk key had been operated prior to receipt of that polling command signal. If both of these conditions are not present, the routine illustrated in FIG. 10B eventually advances to inquiry 834. This inquiry determines if the confirmation command signal which is transmitted by the base unit following an acknowledgment that a talk key has been depressed in some handset unit includes an identification code HSID that identifies some other handset unit. For example, for handset unit 1D, when the confirmation command signal identifies handset unit 1C as the handset unit with which communication will be established, inquiry 834 is reached and is answered in the affirmative. Consequently, instruction 842 is carried out to deenergize the ringing circuit at this handset unit 1D. Thereafter, the handset unit is disposed in its "sleep" mode.

As was described above, in the event that the designated representative station does not transmit a response to the access data command signal, such as represented by the schematic sequence diagram shown in FIG. 8, microcomputer 140 at each of the available handset units advances through the respective instructions and inquiries shown in FIG. 10A to reach inquiry 822. In the absence of a response from the designated representative station, master station 2 does not transmit the handset ringing signal command. Consequently, the timer initiated by instruction 821 times out, inquiry 823 is answered in the affirmative, and the handset unit is disposed in its "sleep" mode. This "sleep" mode is maintained, as represented in FIG. 8, until the master station next transmits another access data command signal, identifying a new handset unit as the representative station.

Any two available handset units may communicate with each other in a so-called intercom mode. For example, let it be assumed that handset unit 1A is disposed in its standby mode and that an intercom key, such as key 133, is operated. Let it be further assumed that the user of handset unit 1A operates keypad 131 to generate the identification code of a handset unit to which intercom communication is desired. Accordingly, microcomputer 140 generates a command signal having control codes which indicate that the intercom key is operated, which identify the particular handset unit to which communication is to be extended, and which identify this particular handset unit initiating this call, i.e. unit 1A. This command signal is supplied to transmitting circuit 110 and is transmitted to master station 2 through the up control channel as an FM signal Su.

Assuming that base unit 21A is available and, thus, is selected by microcomputer 24 to communicate with handset unit 1A, receiving circuit 220 receives this command signal and supplies it to microcomputer 24. The microcomputer detects that intercom communication is requested with the handset unit whose identification code is included in this command signal. As was described above in conjunction with the placing of an outgoing telephone call, the microcomputer selects a communication channel over which handset unit 1A and base unit 21A may communication. In addition, microcomputer 24 selects another available base unit, such as base unit 21B, for transmitting a command signal over the down control channel from this base unit to the remaining handset units. This command signal includes an indication that intercom communication is requested, it identifies the handset unit with which handset unit 1A wishes to communicate, and it identifies the communication channel which may be established between base unit 21B and that handset unit. When this command signal transmitted from base unit 21B is received by the handset unit with which handset unit 1A wishes to communicate, for example, when this command signal is received by handset unit 1H, the ringing circuit thereat is energized, thereby apprising the user of unit 1H of an incoming telephone call. When the user operates talk key 131 of handset unit 1H, a communication channel is established between that handset unit and base unit 21B.

At master station 2, intercom communication is established by microcomputer 24 which controls switch circuit 22 to connect receiving circuit 220 of base unit 21A to transmitting circuit 210 of base unit 21B. Similarly, transmitting circuit 210 of base unit 21A is connected to receiving circuit 220 of base unit 21B. Thus, handset unit 1A may communicate with handset unit 1H via base unit 21A, switch circuit 22 and base unit 21B of master station 2.

At the completion of or at any time during a conversation, if the talk key at either of the handset units which are communicating by intercom connection is operated, communication between that handset unit and the base unit to which it is connected terminates, similar to the manner in which an outgoing telephone call is terminated when the talk key at the handset unit is operated. For example, if the talk key at handset unit 1A is operated, unit 1A together with base unit 21A connected thereto, are returned to their standby mode. Additionally, microcomputer 24 forms a command signal which is transmitted from base unit 21B to handset unit 1H to indicate that the intercom communication has ended. Hence, handset unit 1H and base unit 21B are returned to their respective standby modes.

The foregoing description has assumed that the cordless telephone system includes a control channel over which various command signals may be transmitted prior to the time that the base unit and handset units are connected to the selected communication channel. For example, the access data command signal and the "answer back" response thereto have been described as being transmitted over the control channel. In an alternative embodiment, the cordless telephone system is not provided with a control channel. The manner in which communication is established between a master station and any one of plural remote stations over communication channels (which are understood herein to differ from control channels in that a conversation may be carried out over a communication channel) now will be described in conjunction with the schematic representations of FIGS. 11A-11C. For simplification, FIGS. 11A-11C illustrate one base unit, shown at the right side of the diagram, and one handset unit, shown at the left side of the diagram. In addition, for simplification, only ten duplex channels are illustrated. The numbers 1-10 associated with each base unit and with each handset unit identify respective ones of these communication channels. An "open" circle represents an available communication channel, a solid circle represents a communication channel that is occupied, and an "X" represents a duplex channel used by another system.

In the standby mode, the handset unit scans all communication channels 1-10 in sequence and is adapted to receive an incoming call from the base unit. Likewise, the base unit admits of its standby mode and it too scans all of channels 1-10 in sequence and is adapted to receive an incoming call from the handset unit. When the handset unit initiates a call, it changes over from its standby mode to its talk mode and, as shown in FIG. 11B, seeks an available communication channel. When that channel is found, such as channel 3, the handset unit repeatedly transmits an identification code to the base unit. The handset unit then awaits the return of a base unit identification code.

When the base unit scans channel 3, it receives the identification code from the handset unit and thus remains at channel 3. The base unit then returns its identification code to the handset unit, whereafter the base unit is disposed in its talk mode. Upon receiving tee identification code from the base unit, the handset unit likewise enters its talk mode; and channel 3 is established as the communication channel between the handset and base units. The handset unit now may transmit a telephone number, an intercom number, or the like, to the base unit which, in turn, calls the identified telephone or intercom number. When the called party answers, a conversation may be carried out between the handset unit and that party.

When an incoming telephone call is received from the telephone network, this incoming telephone call is detected by the base unit which seeks an available communication channel over which the telephone call may be extended to a handset unit, as shown in FIG. 11C. Assuming channel 9 is seized, an identification code is transmitted from the base unit to the handset unit. The handset unit scans the communication channels until it reaches channel 9. At that time, it returns its identification code to the base unit and, thereafter, the base and handset units enter their respective talk modes to permit a telephone conversation to be carried out between the handset unit and the calling party.

Although the description of FIGS. 11A-11C has been abbreviated, it will be appreciated that the base unit communicates with several handset units over the illustrated communication channels in substantially the same way as the base unit communicates with the handset units over a control channel. Thus, an available communication channel is used in the same way as the control channel was used in the previously described embodiment, and it also is used in the same way as the communication channel was used in that embodiment. Thus, access data signals may be transmitted from the base unit to all handset units over an available communication channel, and the designated representative station returns an "answer back" response to the base unit over this same channel. Thereafter, the handset ringing signal command is transmitted to all handset units and each handset unit is polled in a manner similar to that described above. As before, when a polled handset unit returns an acknowledgment that its talk key has been operated, the base unit transmits a confirmation command signal which deenergizes the ringing circuits at the remaining handset units and which opens the communication channel with the acknowledging handset unit.

While the present invention has been particularly shown and described with reference to preferred embodiments, it will be readily appreciated by those of ordinary skill in the art that various changes and modifications may be made without departing from the spirit and scope of the invention. It is intended that the appended claims be interpreted as covering the embodiments disclosed herein and all other equivalents thereto.

What is claimed is:

1. A method of establishing a communication channel between a master station and one of plural remote stations in a multi-channel access cordless telephone system, comprising the steps of: transmitting from said master station to said remote stations at the same time access data including station identifying data for designating a selected remote station as a representative station and calling data for seeking a response from said representative station; changing said station identifying data to designate a different remote station as the representative station in the absence of a response to said calling data from the previously designated representative station; polling said remote stations, in sequence, if a designated representative station responds to said calling data and inviting a reply from each polled station; and establishing a communication channel between said master station and a polled station that replies to said polling by the steps of including in said access data channel identifying data for identifying the communication channel to be established, connecting each remote station operably capable of communication with said master station to the identified communication channel, re-connecting said each remote station to a control channel in the absence of a response to said calling data from the previously designated representative station, connecting said master station to said identified communication channel if a designated representative station responds to said calling data, and transmitting over said identified communication channel from said master station to said remote stations a signal indicating that polling is to begin.

2. The method of claim 1 wherein said master station normally is connected to said remote stations by said control channel over which said access data and said response are transmitted, and wherein each remote station normally exhibits a quiescent state to receive said access data.

3. The method of claim 1 wherein said access data is transmitted from said master station simultaneously to said remote stations by an available one of the multi-channels, and said available one channel is used to transmit a response to said calling data to said master station from the previously designated representative station, to poll said remote stations, and to define said communication channel between said master station and the polled station that replies to said polling.

4. The method of claim 1 further comprising the step of transmitting from said master station to said remote stations a ringing signal representing an incoming telephone call if a response is returned to said master station from said representative station.

5. The method of claim 4 wherein each remote station includes incoming call indicating means, and further comprising the steps of energizing the call indicating means in said remote stations in response to the transmitted ringing signal, acknowledging the energization of the call indicating means in at least one remote station, and returning an acknowledgment to said master station from a remote station when that remote station is polled.

6. The method of claim 5 wherein the step of acknowledging the energization of the call indicating means comprises operating a talk key at a remote station.

7. The method of claim 5 further comprising the step of terminating the ringing signal transmitted from said master station to said remote stations when said acknowledgment is returned.

8. The method of claim 1 wherein said access data is transmitted over a control channel simultaneously to said remote stations, and said response is returned to said master station from said representative station over said control channel.

9. The method of claim 8, further comprising the step of connecting said master station and said remote stations from said control channel to said communication channel after said access data is received by said remote stations.

10. The method of claim 9 further comprising the step of including in said access data transmitted from said master station to said remote stations channel identifying data for selecting said communication channel.

11. The method of claim 10 wherein said remote stations are polled over said communication channel and a reply is returned to said master station from a polled remote station over said communication channel.

12. A multi-channel access cordless telephone system having a master station and plural remote stations, comprising: access data transmission means for transmitting from said master station to said remote stations at the same time access data including station identifying data for designating a selected remote station as a representative station and channel identifying data for identifying a communication channel to be established; response detecting means for detecting a response to said access data from the designated representative station; identification changing means for changing said station identifying data to designate a different remote station as the representative station in the absence of a response to said access data from the previously designated representative station; polling means for polling said remote stations, in sequence, if a response to said access data from a designated representative station is detected and inviting a reply from each polled station; and channel establishing means for sensing a reply from a polled remote station to establish said communication channel between said master station and the polled station that replies to said polling; said master station including means for connecting said master station to the identified communication channel if said response detecting means detects a response from a designated representative station to said access data, and means for transmitting over said identified communication channel from said master station to said remote stations a signal indicating that polling is to begin; and each remote station operably capable of communication with said master station including means for connecting that remote station to said identified communication channel, and means for reconnecting said each remote station to a control channel if said response detecting means does not detect a response to said access data from the previously designated representative station.

13. The system of claim 12 wherein said master station normally is connected to said remote stations by said control channel over which said access data and said response are transmitted, and wherein each remote station normally exhibits a quiescent state to receive said access data.

14. The system of claim 12 wherein said access data transmission means includes means for transmitting access data from said master station simultaneously to said remote stations by an available one of the multichannels; said remote station includes response generating means for supplying to said available one channel a response to said access data for transmission to said master station from the previously designated representative station; said polling means is coupled to said available one channel to poll said remote stations thereover; and said available one channel constitutes said communication channel between said master station and the polled station that replies to said polling.

15. The system of claim 12 further comprising a control channel over which said access data is transmitted simultaneously to said remote stations, and over which said response is returned to said master station from said representative station.

16. The system of claim 15, further comprising channel connecting means at said master station for connecting said master station from said control channel to said communication channel when a response to said access data is detected at said master station from said representative station; and channel connecting means at a remote station for sensing receipt of said access data to connect said remote station to said communication channel.

17. The system of claim 16 wherein said access data includes channel identifying data for selecting said communication channel; and the channel connecting means at the remote station includes means for sensing said channel identifying data to connect said remote station to the identified communication channel.

18. The system of claim 17 wherein said polling means transmits polling signals from said master station over said communication channel and each remote station includes reply means for generating and returning a reply to said master station over said communication channel in response to said polling signal.

19. The system of claim 12 wherein said master station includes ringing signal generating means for transmitting to said remote stations a ringing signal representing an incoming telephone call if a response to said access data from said representative station is detected.

20. The system of claim 19 wherein each remote station includes incoming call indicating means, ringing signal detecting means for energizing the call indicating means in response to the transmitted ringing signal, and acknowledgment means for selectively returning to said master station an acknowledgment that said call indicating means is energized if said remote station is polled.

21. The system of claim 20 wherein said acknowledgment means comprises a selectively operable talk key.

22. The system of claim 21 wherein said master station includes means for sensing the operation of a talk key at a remote station to terminate the ringing signal transmitted to said remote stations.

* * * * *